(12) United States Patent
Tsuda et al.

(10) Patent No.: US 10,786,740 B2
(45) Date of Patent: Sep. 29, 2020

(54) INFORMATION PROCESSING SYSTEM, INFORMATION PROCESSING METHOD, INFORMATION PROCESSING APPARATUS, AND COMPUTER-READABLE NON-TRANSITORY STORAGE MEDIUM HAVING STORED THEREIN INFORMATION PROCESSING PROGRAM

(71) Applicant: NINTENDO CO., LTD., Kyoto (JP)

(72) Inventors: Munetaka Tsuda, Kyoto (JP); Fumihiko Tamiya, Kyoto (JP); Yosuke Fujino, Kyoto (JP); Tsuyoshi Kurita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/959,529

(22) Filed: Apr. 23, 2018

(65) Prior Publication Data
US 2018/0361252 A1 Dec. 20, 2018

(30) Foreign Application Priority Data
Jun. 19, 2017 (JP) .................................. 2017-119764

(51) Int. Cl.
*A63F 9/24* (2006.01)
*A63F 11/00* (2006.01)
(Continued)

(52) U.S. Cl.
CPC .............. *A63F 13/79* (2014.09); *A63F 13/35* (2014.09); *A63F 13/48* (2014.09); *A63F 13/73* (2014.09);
(Continued)

(58) Field of Classification Search
USPC .......................... 463/20, 22, 25, 29, 30, 39
See application file for complete search history.

(56) References Cited

U.S. PATENT DOCUMENTS

| 2004/0068750 A1* | 4/2004 | Maa ..................... G06Q 30/02 725/113 |
| 2004/0224773 A1* | 11/2004 | Sham ................... G06Q 30/02 463/42 |

(Continued)

OTHER PUBLICATIONS

Nintendo Co., Ltd., "Nintendo Switch Parental Controls mobile app", [online], Retrieved on Jun. 7, 2017, Internet, <URL: https://www.nintendo.co.jp/hardware/switch/parentalcontrols/>, 8 pages.

*Primary Examiner* — Adetokunbo O Torimiro
(74) *Attorney, Agent, or Firm* — Nixon & Vanderhye, P.C.

(57) ABSTRACT

In a first information processing apparatus, a plurality of users can be registered. When an application is executed, any of the registered users is selected as an application executing user. Execution state data in which application information indicating the application being executed is associated with the selected user is transmitted to a server. In the server, the execution state data is aggregated to generate aggregate data. In this case, the aggregation is performed such that an execution state of the application is recognizable for each application executing user. The aggregate data is transmitted in response to a request from a second information processing apparatus. The second information processing apparatus displays the execution state of the application for each application executing user on the basis of the received aggregate data.

14 Claims, 18 Drawing Sheets

(51) Int. Cl.

| | |
|---|---|
| *G06F 13/00* | (2006.01) |
| *G06F 17/00* | (2019.01) |
| *A63F 13/79* | (2014.01) |
| *G06F 3/0484* | (2013.01) |
| *G06F 3/0482* | (2013.01) |
| *A63F 13/48* | (2014.01) |
| *A63F 13/35* | (2014.01) |
| *A63F 13/73* | (2014.01) |

(52) U.S. Cl.
CPC .......... *G06F 3/0482* (2013.01); *G06F 3/0484* (2013.01); *A63F 2300/5586* (2013.01)

(56) References Cited

U.S. PATENT DOCUMENTS

| | | | |
|---|---|---|---|
| 2007/0126884 A1* | 6/2007 | Xu .................... | G06K 9/00221 348/220.1 |
| 2008/0288612 A1* | 11/2008 | Kwon .................. | G06Q 10/00 709/220 |
| 2016/0330078 A1* | 11/2016 | Bostick .................. | H04W 4/21 |

* cited by examiner

F I G. 2
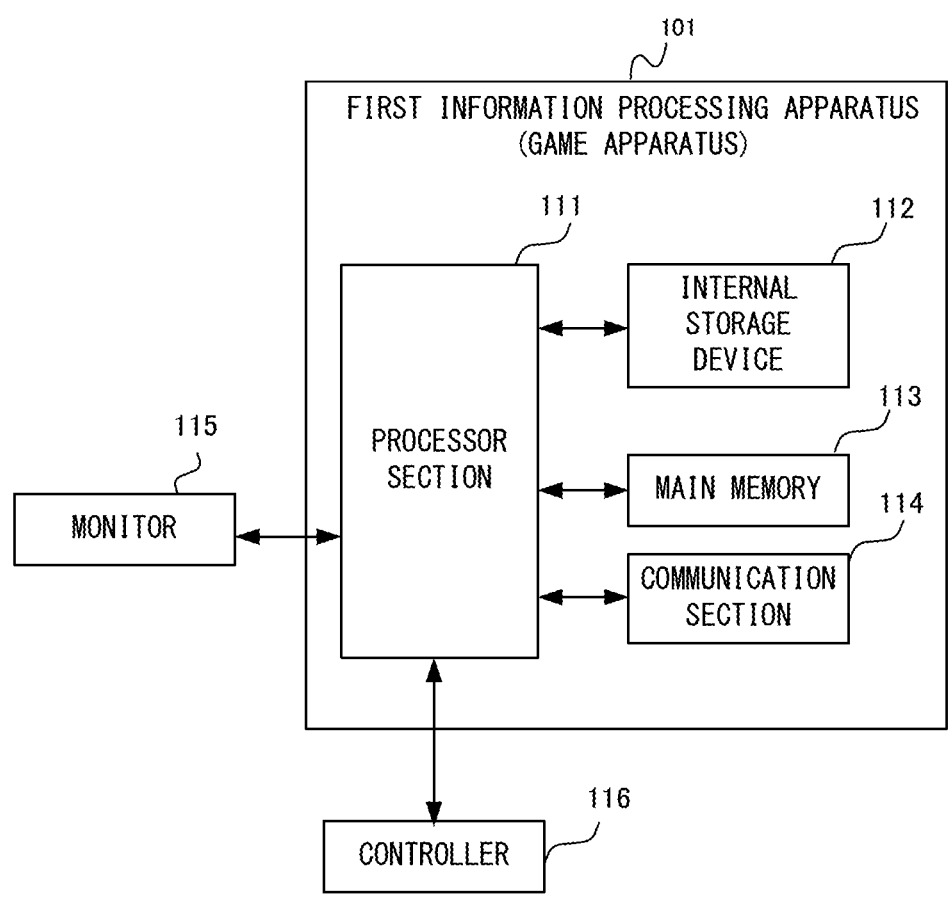

FIG. 14

| APPARATUS SERIAL ID | AGGREGATE DATA |
|---|---|
| 000001 | ... |
| 000002 | ... |
| ⋮ | ⋮ |

FIG. 15

| YEAR-MONTH-DAY | USER INFORMATION | | EXECUTION STATE | |
|---|---|---|---|---|
| yynndd | FIRST USER NAME | FIRST USER IMAGE DATA | PROCESS INFORMATION 1 | EXECUTION TIME DATA 1 |
| | | | PROCESS INFORMATION 2 | EXECUTION TIME DATA 2 |
| | | | ⋮ | ⋮ |
| | | | PROCESS INFORMATION n | EXECUTION TIME DATA n |
| | SECOND USER NAME | SECOND USER IMAGE DATA | PROCESS INFORMATION 1 | EXECUTION TIME DATA 1 |
| | | | PROCESS INFORMATION 2 | EXECUTION TIME DATA 2 |
| | | | ⋮ | ⋮ |
| | | | PROCESS INFORMATION n | EXECUTION TIME DATA n |
| | ⋮ | | | |
| | m-TH USER NAME | m-TH USER IMAGE DATA | PROCESS INFORMATION 1 | EXECUTION TIME DATA 1 |
| | | | PROCESS INFORMATION 2 | EXECUTION TIME DATA 2 |
| | | | ⋮ | ⋮ |
| | | | PROCESS INFORMATION n | EXECUTION TIME DATA n |
| ⋮ | ⋮ | ⋮ | ⋮ | ⋮ |

F I G. 1 6
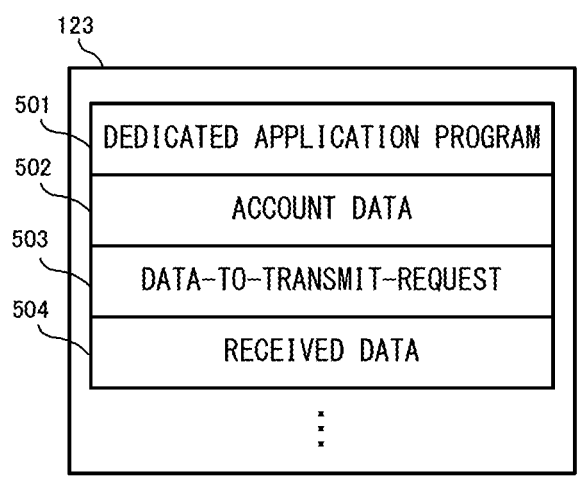

0:00          12:00          24:00

INFORMATION PROCESSING SYSTEM, INFORMATION PROCESSING METHOD, INFORMATION PROCESSING APPARATUS, AND COMPUTER-READABLE NON-TRANSITORY STORAGE MEDIUM HAVING STORED THEREIN INFORMATION PROCESSING PROGRAM

CROSS REFERENCE TO RELATED APPLICATION

The disclosure of Japanese Patent Application No. 2017-119764, filed on Jun. 19, 2017, is incorporated herein by reference.

FIELD

The exemplary embodiments herein relate to an information processing system, and more particularly, to a process of displaying, on a second information processing apparatus, an execution state of an application in a first information processing apparatus.

BACKGROUND AND SUMMARY

An information processing apparatuses having a so-called parental control function, which allows a parent to supervise and restrict the child's use of the information processing apparatuses, have conventionally been known. For example, a parent can set a play-time limit on the use of a game machine. In addition, when the child tries to play also after the time limit has been reached, the child may be notified of an alarm message displayed on the game apparatus. Furthermore, known is an information processing system that allows the parent to check, on the smartphone, etc., a play state of a game played by the child on such a game apparatus, for example. In this information processing system, a game apparatus is in conjunction with a smartphone, and information about a play state on the game apparatus can be transmitted to the smartphone, on which the play state can then be displayed.

In the above information processing system, what game has been played on a game apparatus, and how long the game has been played, can be indicated. In this regard, the present inventor has found that there is room for further improvement from a viewpoint that the convenience of the user is improved by presenting more detailed information.

Therefore, it is an object of the exemplary embodiments to provide an information processing system in which an execution state of an application in an information processing apparatus can be displayed on another information processing apparatus, etc., in more detail.

In order to attain the object described above, the following configurations are exemplified.

An example of a configuration is an information processing system including a server, a first information processing apparatus, and a second information processing apparatus. The first information processing apparatus includes a user information storage section, an application execution section, an execution state data generation section, and a transmission section. The user information storage section stores a plurality of pieces of user information related to users who use the first information processing apparatus, according to a registration operation performed by each of the users. The application execution section executes a predetermined application program, and allows a user as an application executing user to select at least one of the plurality of pieces of user information stored in the user information storage section during execution of the application program. The execution state data generation section generates execution state data in which application information including at least identification information for identifying the application program being executed is associated with the user information about the application executing user selected during execution of the application program. The transmission section transmits the generated execution state data to the server.

The server includes a state data reception section, an aggregation processing section, and an aggregate data transmission section. The state data reception section receives the execution state data transmitted from the first information processing apparatus. The aggregation processing section executes an aggregation process on the basis of the received execution state data to generate aggregate data such that an execution state of the application is recognizable at least for each application executing user. In response to a request from the second information processing apparatus, the aggregate data transmission section transmits the aggregate data to the second information processing apparatus as a requester.

The second information processing apparatus includes an aggregate data requesting section, an aggregate data reception section, and a display processing section. The aggregate data requesting section requests the server to transmit the aggregate data. The aggregate data reception section receives the aggregate data transmitted from the server. The display processing section displays the execution state of the application for each application executing user on the basis of the received aggregate data.

According to the above example of the configuration, the execution state (e.g., a play state of a game) of an application in the first information processing apparatus such as a game apparatus can be displayed on the second information processing apparatus such as a smartphone so as to be recognizable as the execution state for each of the plurality of users registered in the first information processing apparatus.

In another example of the configuration, the first information processing apparatus may further include an application storage section configured to store a plurality of application programs. The application execution section may be capable of selectively executing one of the plurality of application programs. The display processing section may display the execution state for each application executing user and for each application.

According to the above example of the configuration, the execution state of a game, etc., can be presented to a user such that the user is allowed to recognize the execution state in more detail.

In another example of the configuration, when a plurality of pieces of user information are selected during execution of an application program, the transmission section may generate the execution state data such that the execution state of each application executing user is distinguishable from an execution state of another application executing user.

According to the above example of the configuration, for example, when a plurality of users registered in a game apparatus are synchronously playing, display can be made such that a play time for each user can be recognized, and the play state can be presented in more detail for each user.

In another example of the configuration, the application execution section may be capable of executing the application program without the application executing user being selected. When the application program is being executed without the application executing user being selected, the execution state data generation section may generate the execution state data in which the application information is associated with information indicating an anonymous user.

According to the above example of the configuration, for example, even when a game, etc., has been played without a user being identified, a play state such as a play time can be presented.

In another example of the configuration, the first information processing apparatus may further include a parental control setting section configured to set a restriction on an execution allowable time of the application program in the first information processing apparatus, and temporarily cancel the restriction. When the restriction set by the parental control setting section is temporarily canceled, the execution state data generation section may generate the execution state data including information indicating that the restriction is temporarily canceled. The aggregation processing section may aggregate a time during which the restriction is temporarily canceled. The display processing section may display the time during which the restriction is temporarily canceled.

According to the above example of the configuration, for example, when parental control restriction has been set by a parent, and the restriction has been temporarily canceled, parent's attention is called and the parent can be made aware of the fact of temporal cancellation, by presenting a time during which the restriction has been temporarily canceled.

In another example of the configuration, the first information processing apparatus may further include a downloading section configured to download and store a predetermined application program executable by the application execution section. The execution state data generation section may generate the execution state data including application information including a title of the application program downloaded by the downloading section. The display processing section may display information about the downloaded application program.

According to the above example of the configuration, for example, when a child has purchased and downloaded game software, etc., parent's attention is called and the parent can be made aware of the child's purchase action.

In another example of the configuration, the application program may be a game program. When the game program is not being executed by the application execution section, and a system process excluding a process of the game program is being executed in a foreground, the execution state data generation section may generate the execution state data including non-application execution state data indicating an execution state related to the system process. The display processing section may further display the execution state related to the system process.

According to the above example of the configuration, for example, a time during which an operation other than play in a game application, such as an operation to a home menu, has been performed on the game apparatus, can be presented as a portion of a play time. Therefore, a play state on the game apparatus can be displayed on the second information processing apparatus in more detail.

In another example of the configuration, the first information processing apparatus may be a game apparatus, the application program may be a game program, and the execution state may be a play time of a game process executed in the game apparatus.

According to the above example of the configuration, for example, parents can easily know, using a smartphone, etc., a play time for each of a plurality of children who have played a game apparatus.

In another example of the configuration, the first information processing apparatus may further include a parental control section configured to set an execution allowable time of the game program, and an alarm notification section configured to, when the game program is executed after the execution allowable time set by the parental control section has elapsed, notify the second information processing apparatus of alarm information indicating execution after a time limit. The second information processing apparatus may further include an alarm temporarily cancelling section configured to transmit, to the first information processing apparatus, an instruction to temporarily cancel notification of the alarm information by the alarm notification section, according to an operation of the user.

According to the above example of the configuration, for example, a parent can know whether or not his/her child has played a game too much, or can set a restriction on game play. In addition, the parent can temporarily cancel restriction for a special day, such as a birthday, by a simple operation, resulting in improvement in the convenience of the user.

According to the present embodiment, more detailed information about an execution state in an information processing apparatus such as a game apparatus, can be displayed on an information processing apparatus such as a smartphone.

BRIEF DESCRIPTION OF THE DRAWINGS

FIG. 2 is a block diagram showing a non-limiting example of a configuration of a game apparatus 101;

FIG. 14 shows a non-limiting example of a data structure of an execution state database 402;

FIG. 15 shows a non-limiting example of a data structure of aggregate data 422;

FIG. 16 shows a non-limiting example of a program and information stored in a main memory 123 of the smartphone 102;

DETAILED DESCRIPTION OF NON-LIMITING EXAMPLE EMBODIMENTS

Hereinafter, an exemplary embodiment will be described.

Figure 1:
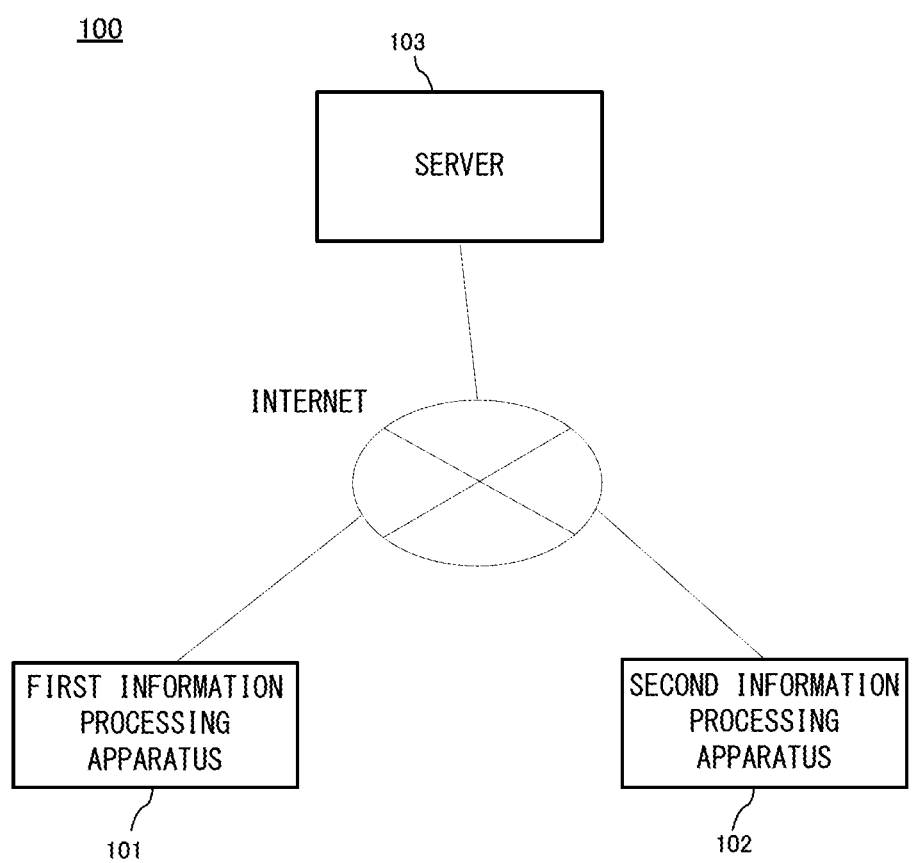
FIG. 1 is a schematic diagram showing a non-limiting example of an overall configuration of a game system according to an exemplary embodiment.

FIG. 1 is a schematic diagram showing a non-limiting example of an overall configuration of an information processing system according to the present embodiment. The information processing system 100 according to the present embodiment includes a first information processing apparatus 101, a second information processing apparatus 102, and a server 103. In the present embodiment, as a non-limiting example of the first information processing apparatus 101, a stationary game apparatus (hereinafter referred to as the game apparatus 101) will be described. As a non-limiting example of the second information processing apparatus 102, a smartphone (hereinafter referred to as the smartphone 102) will be described. The server 103, the game apparatus 101, and the smartphone 102 are configured so as to be able to communicate with each other through the Internet.

Next, the configuration of hardware in the above system will be described. Firstly, the game apparatus 101 will be described. FIG. 2 is a functional block diagram of the game apparatus 101. In FIG. 2, the game apparatus 101 includes a processor section 111, an internal storage device 112, a main memory 113, and a communication section 114. A monitor 115 and a controller 116 are also connected to the game apparatus 101 (either wirelessly or in a wired manner). The processor section 111 executes later-described information processing and executes a system program (not shown) for controlling overall operation of the game apparatus 101, thereby controlling operation of the game apparatus 101. The processor section 111 may include a single processor or a plurality of processors. The internal storage device 112 stores various programs to be executed by the processor section 111, and various kinds of data to be used in the programs. The internal storage device 112 is, for example, a flash EEPROM or a hard disk device. The main memory 113 temporarily stores a computer program and information. The communication section 114 connects to a network by wired or wireless communication, and transmits and receives predetermined data to and from the server 103 and the smartphone 102. The monitor 115 is, for example, a liquid crystal monitor. The controller 116 is an input device for receiving an operation from a user.

Figure 3:
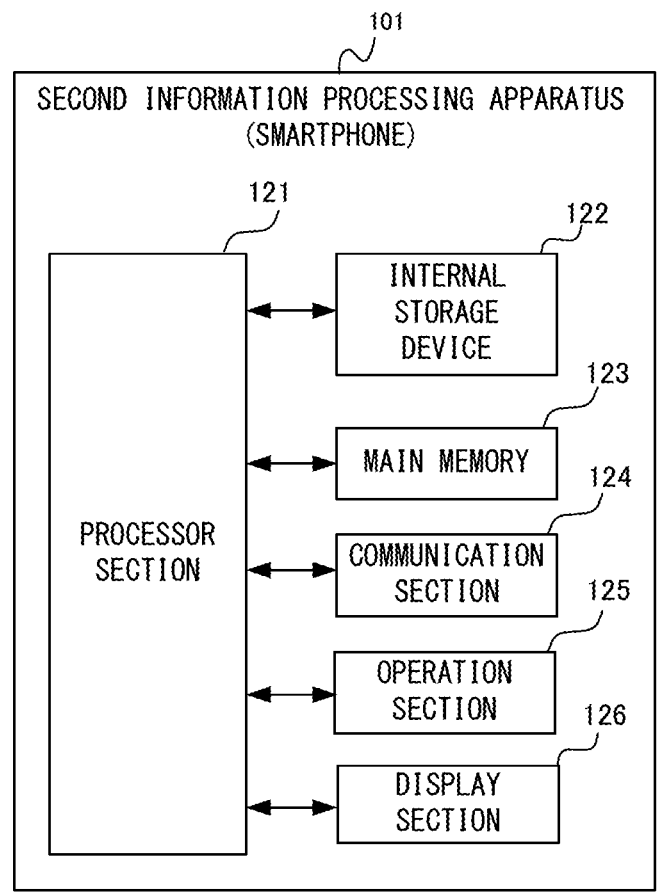
FIG. 3 is a block diagram showing a non-limiting example of a configuration of a smartphone 102.

Next, a configuration of the smartphone 102 will be described. FIG. 3 is a functional block diagram of the smartphone 102. In FIG. 3, the smartphone 102 includes a processor section 121, an internal storage device 122, a main memory 123, a communication section 124, an operation section 125, and a display section 126. The processor section 121 executes later-described information processing and executes a system program for controlling overall operation of the smartphone 102, thereby controlling operation of the smartphone 102. The internal storage device 122 stores various programs to be executed by the processor section 121, and various kinds of data to be used in the programs. The main memory 123 temporarily stores a computer program and information. The communication section 124 connects to a network by wired or wireless communication, and transmits and receives predetermined data to and from the game apparatus 101 and the server 103. The operation section 125 is an input device for receiving an operation from a user. The display section 126 is typically a liquid crystal display device. In processing according to the present embodiment, a touch panel integrated with a liquid crystal screen is assumed as the operation section 125 and the display section 126. In another embodiment, a predetermined pointing device other than a touch panel may be used as the operation section 125.

Figure 4:
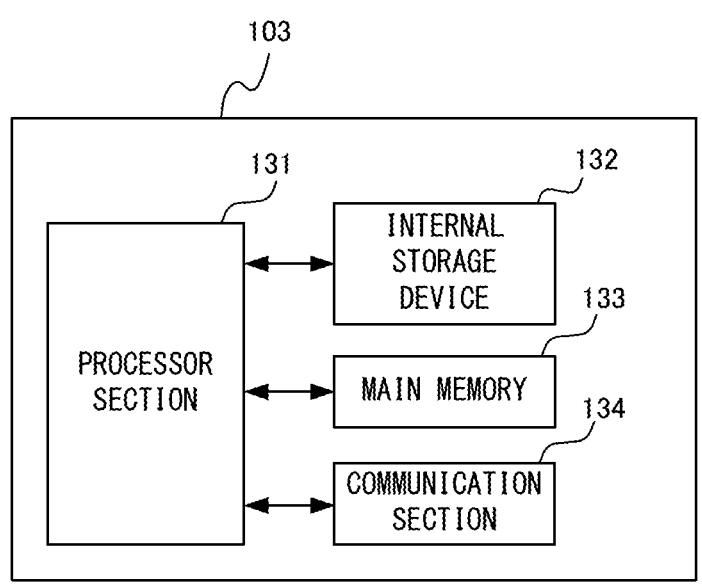
FIG. 4 is a block diagram showing a non-limiting example of a configuration of a server 103.

Next, a configuration of the server 103 will be described. FIG. 4 is a functional block diagram of the server 103. The server 103 includes at least a processor section 131, an internal storage device 132, a main memory 133, and a communication section 134. The processor section 131 executes various programs for controlling the server 103. The internal storage device 132 stores various programs to be executed by the processor section 131, and various kinds of data to be used. The main memory 133 temporarily stores a computer program and information. The communication section 134 connects to a network by wired or wireless communication, and transmits and receives predetermined data to and from the game apparatus 101, the smartphone 102, and another server (not shown).

Next, an overview of information processing according to the present embodiment will be described. Before the description, for the sake of easy understanding of that processing, some of the functions of the game apparatus 101 that are involved in processing according to the present embodiment will be mainly described.

(Multiple-User Registration Function)

Figure 5:
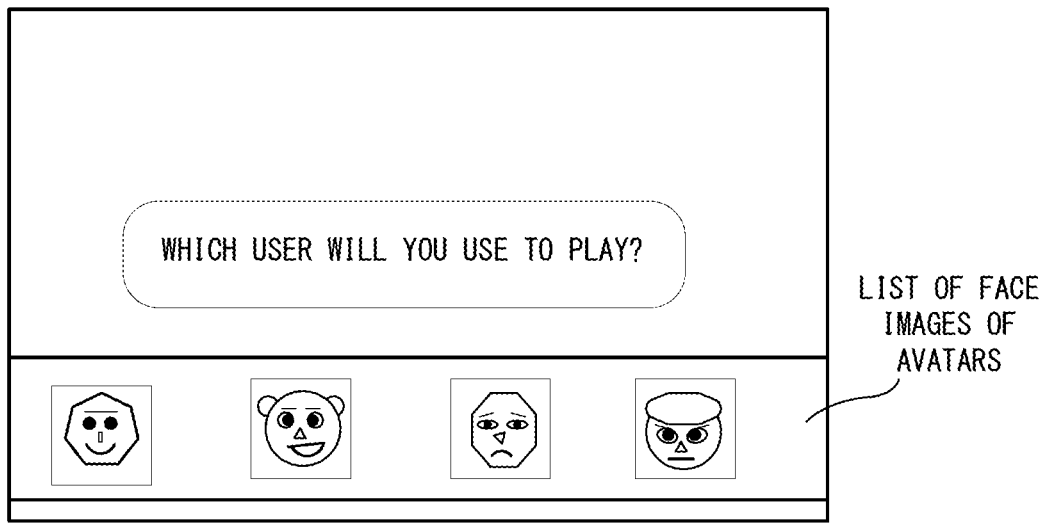
FIG. 5 shows a non-limiting example of a game screen of the game apparatus 101.

Firstly, the game apparatus 101 has a function of registering a plurality of users. For example, user information is generated and registered (stored) in the game apparatus 101 according to a registration operation performed by a user through the controller 116. The user information includes, for example, a nickname of a user, data of a so-called avatar of the user, etc. The user information thus generated and registered can be selected by a user when the user plays a predetermined game on the game apparatus 101. For example, in the game apparatus 101, when a certain game is started, a user selection screen as shown in FIG. 5 is displayed on the monitor 115. In FIG. 5, a list of predetermined images (here, face images of avatars) indicating users registered in the game apparatus 101 is displayed in a lower half portion of the game screen. A user who will play a game selects an image corresponding to his/her own user information (a face image of his/her own avatar) in the list. As a result, the user who will play a game can be selected, and, for example, a game score, etc., may be stored in the game apparatus 101 in association with user information related to the selected user. In addition, when the game is being played, the avatar of the selected user may be allowed to appear as a player character, for example. In the description that follows, a user thus selected when a game is played is referred to as a "playing user". In the present embodiment, up to two playing users can be selected in the case of a synchronous two-player game play, a battle game play, etc. In this case, at a timing when a two-player game play is started, information for a second user may be selected. Some games do not require such user selection. In this case, a user performs game play as an "anonymous user". In another embodiment, the number of playing users is not limited to up to two, and three or more players may be selected.

(Parental Control Function)

The game apparatus 101 also has the so-called parental control function. The game apparatus 101 allows designation of a time range during which a game is allowed to be played based on day of week. A parent may desire to set a restriction on how long his/her child can play with the game apparatus 101. In this case, for example, the parent can set the game apparatus 101 such that a game can be played on the game apparatus 101 only during a time from 7:00 p.m. to 9:00 p.m. on weekdays. The game apparatus 101 according to the present embodiment can be previously set such that one of the following two processes is performed when the designated time range has been exceeded during game play of a certain player. One of the two processes is to display an alarm message indicating that the time when the game is allowed to be played has elapsed, without stopping the game process itself. In this case, the game play can be continued as it is. The other process is to temporarily stop the game process, and display a stop message indicating that the designated time has been reached. For the stop message, for example, displayed are a first option of turning off (setting in sleep mode) the game apparatus 101, and a second option of canceling the restriction on use, one of which is selected by a user. In this case, typically, a parent can temporarily cancel the restriction by inputting a personal identification number to the game apparatus 101. In other words, when the second option is selected, input of a personal identification number is required, and therefore, the child cannot cancel the restriction on use without the parent's permission. In the present embodiment, an operation for setting parental control can be performed on the smartphone 102 (using a dedicated application installed therein). Set contents are transmitted to the game apparatus 101 through the server 103, and a setting process based on the set contents is executed in the game apparatus 101.

As described above, the game apparatus 101 according to the present embodiment has the multiple-user registration function and the parental control function. In a system configuration, according to the present embodiment, including the game apparatus 101, the following process can be executed. In the present embodiment, a play state can be displayed for each user registered in the game apparatus 101, on the smartphone 102 possessed by his/her parent (using a dedicated application installed therein), for example. As a result, the parent can know what game has been played by his/her child on the game apparatus 101, and how long the game has been played, for example. As to the unit of a time period for aggregating, the time period from 0:00 a.m. to 11:59 p.m. is handled as one day in the present embodiment.

More specifically, the following processes are executed in the present embodiment.

(Overview of Process in Game Apparatus 101)

Initially, in the game apparatus 101, the following process is executed. Initially, the game apparatus 101 (the processor section 111 thereof) generates, at intervals of 10 seconds, execution state data representing a play state, at that point of time, on the game apparatus 101. Specifically, the game apparatus 101 acquires, at intervals of 10 seconds, information about an application that is executed as a foreground process at that point of time. As used herein, the "foreground process" refers to a process that is currently displayed on a screen (the concept opposite to the so-called background process). In the present embodiment, it is assumed that there are two types of processes, i.e., a game process and a system process. The "game process" refers to a process involved in a game application that is currently played by a playing user. Therefore, when the foreground process is a game process, information about a game application (e.g., an application ID, etc.), and information about the playing user who is playing the game application, are acquired. In other words, acquired is information indicating a play state, at that point of time, on the game apparatus 101. In the present embodiment, it is assumed that, as the playing user information, data of a "nickname" and "user image" of each playing user are acquired. When game play is performed without selection of a user, data dedicated to an anonymous user, which is previously prepared, is acquired as a "nickname" and a "user image".

Meanwhile, the "system process" refers to a process involved in an application other than games, such as a process for the so-called home menu (home screen) or a setting screen process summoned from the menu. Therefore, at a timing when the home menu is being operated, information indicating that the foreground process is a system process is set in the execution state data. Specifically, when the foreground process is a system process, a time during which the process is executed is also counted as a play time. In other words, such a time is counted as a play time other than a game play time (hereinafter referred to as "other play time"). In this case, information about an individual playing user is not acquired.

After the above process has been performed, the game apparatus 101 adds, to the acquired or set information, a time stamp indicating a timing when the process has been performed, and stores the resultant information as the execution state data in the main memory 113. The execution state data is transmitted to the server 103 at intervals of 10 minutes. Specifically, the execution state data is accumulated for 10 minutes (a total of 60 pieces of execution state data where one piece of execution state data is data acquired at one time), and the execution state data accumulated for 10 minutes is collectively transmitted to the server 103. The data to be transmitted is hereinafter referred to as "state-data-to-be-transmitted". Data other than the above data may be transmitted as information to be transmitted. The data that may be transmitted is described in detail below. The intervals (10-second intervals) at which the information is acquired and the intervals (10-minute intervals) at which data is transmitted to the server 103, are merely illustrative. In another embodiment, any interval may be used.

Here, predetermined game software or additional downloadable contents (DLC) can be purchased and downloaded from so-called online shops using the game apparatus 101 according to the present embodiment. Basically, a purchase operation can be performed by activating a "shop" application included in the home menu. A process involved in the "shop" application in this case is handled as a system process, and as described above, the time during which the process is executed is counted as "other play time". Meanwhile, in some game applications, an online shop application can be summoned from inside a game to purchase DLC, etc. Thus, the time for purchase from a shop in the case of a "shop" application being summoned from inside a game, is counted as a play time of a playing user in the game.

(Overview of Process in Server 103)

Next, an overview of a process in the server 103 will be described. In the server 103, state-data-to-be-transmitted that is transmitted from a plurality of game apparatuses 101 is classified according to the sender game apparatus, and stored in a predetermined database. Each game apparatus 101 is previously assigned a serial ID, etc., for uniquely identifying the individual game apparatus. State-data-to-be-transmitted includes such a serial ID. In the server 103, state-data-to-be-transmitted is classified using the serial ID. In the server 103, a process of aggregating the stored state-data-to-be-transmitted is also executed. Specifically, a process of aggregating the execution state (play time) of a game application, etc., is executed for each game apparatus 101.

(Overview of Process in Smartphone 102)

Next, an overview of a process in the smartphone 102 will be described. A dedicated application for carrying out this process is installed in the smartphone 102 according to the present embodiment. When the dedicated application is used, the game apparatus 101 the execution state of which is to be checked by the user is set (registered). This is carried out, for example, by storing a predetermined account and the above serial ID in association with each other, in the smartphone 102, or as account information in the server 103. The number of registered game apparatuses 101 is not limited to one, and may be plural. In the dedicated application, parental control can be set for a designated game apparatus 101. Specifically, an operation for setting parental control can be performed on the smartphone 102, and set contents are transmitted to an intended game apparatus 101 through the server 103. In the game apparatus 101, a process of setting parental control is performed as appropriate on the basis of the transmitted contents. The dedicated application also allows display of information about the execution state of an application, etc., involved in the designated game apparatus 101, as described below.

Hereinafter, an overview of a process involved in displaying of the play state will be described with reference to exemplary screens. When the dedicated application is activated, a log-in process to the server 103 is performed using the predetermined account. Thereafter, a process of acquiring the aggregate data from the server 103 is executed on the basis of the user's operation, etc. Thereafter, various screens are displayed using the acquired data as described below.

FIGS. 6 to 9 show a non-limiting example of screens displayed on the display section 126 of the smartphone 102 by processes being performed by the dedicated application. In the present embodiment, the execution state is displayed in a daily or monthly format.

(Daily Screen)

Figure 6:
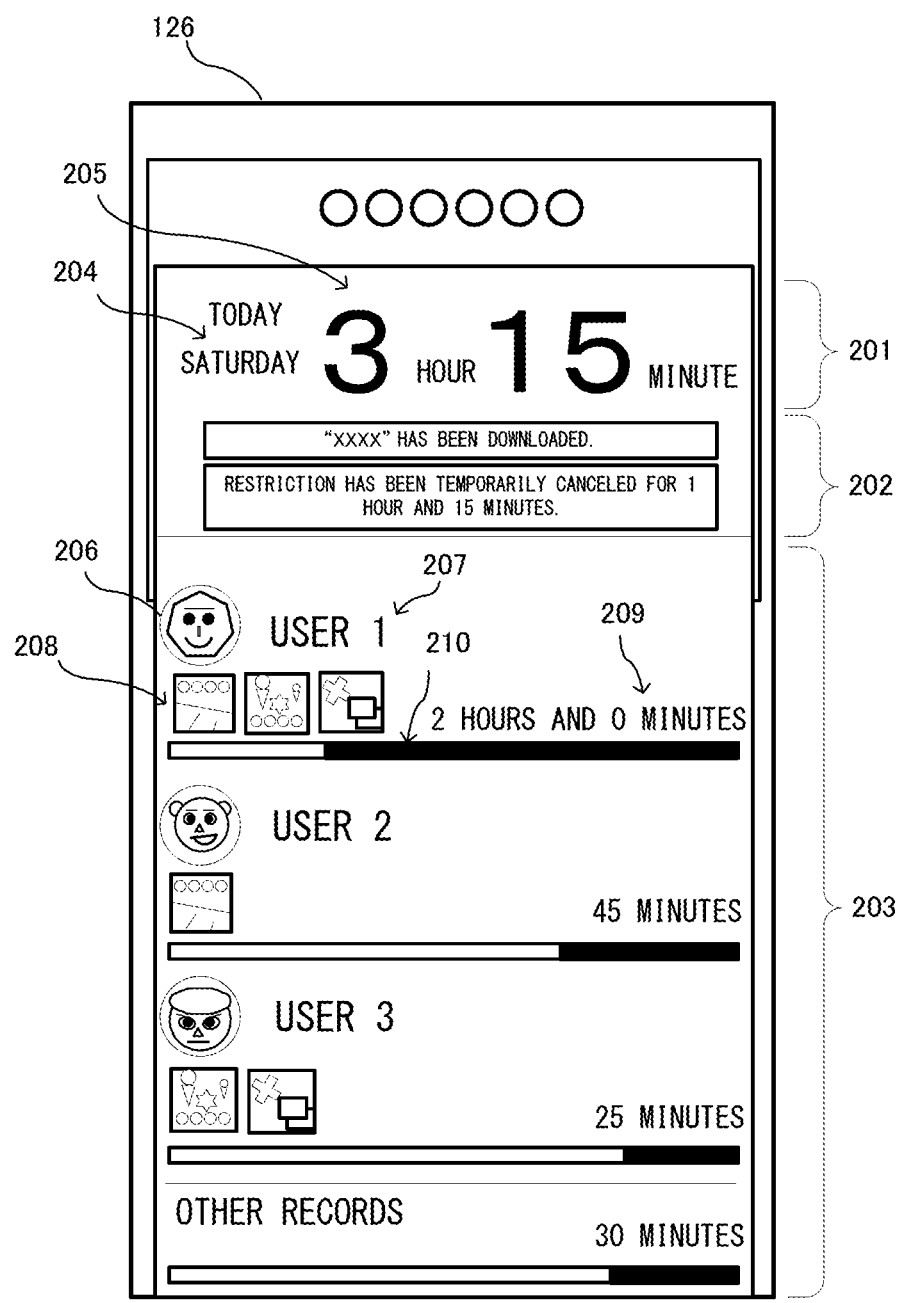
FIG. 6 shows a non-limiting example of a screen of the smartphone 102.

FIG. 6 shows a non-limiting example of a display screen in a daily format. In FIG. 6, the display screen includes a total execution time display area 201, a notification area 202, and a user list area 203. An image or title that indicates a game which has been most often played on the target day may be displayed in an upper portion of the screen.

In the total execution time display area 201, displayed are a target day 204 indicating the date of an execution state to be displayed, and a total time 205 for which an application, etc., has been executed (typically, a game has been played) on the game apparatus 101 on the target day. The total time is hereinafter referred to as a "total play time".

In the notification area 202, displayed is a notification of information related to the execution state (play state). Here, the notification contains the following contents, for example.

(1) A period of time during which parental restriction has been temporarily canceled. This period of time is not counted as a part of the total play time. Restriction is temporarily canceled basically by the parent performing a canceling operation (e.g. the above operation of inputting a personal identification number). As to the period of time during which parental restriction has been temporarily canceled, the parent him/herself is considered to know the circumstances to some extent, and therefore, in the present embodiment, the period of time during which parental restriction has been temporarily canceled is not included in the total play time 205. A separate notification is only provided in order to call parent's attention to the fact that parental restriction has been temporarily canceled. For example, when the child has temporarily canceled restriction without the parent's permission, the parent can be made aware of that.

(2) Information about a downloaded game, etc. As described above, game software can be purchased and downloaded using the game apparatus 101 according to the present embodiment. Therefore, in order to call parent's attention and make the parent aware of what game the child has purchased and downloaded, etc., such information is also included in the notification. For example, when the child has purchased and downloaded a game without parent's permission, the parent can be made aware of that.

(3) Notification of an error (mistake) in inputting a personal identification number. In the present embodiment, in the game apparatus 101, input of a personal identification number is required to cancel parental restriction. Therefore, such a notification is performed in order to call parent's attention and make the parent aware of not only his/her own mistake in inputting a personal identification number, but also his/her child's action to try to input the personal identification number and thereby cancel the restriction without parent's permission.

Instead of or in addition to the above notifications, other various notifications that call parent's attention and make the parent aware of the child's play states may be displayed as appropriate. For example, if parental control is set such that even when a set time is reached, execution of a game is not stopped while an alarm is only displayed, a notification indicating a period of time during which the game has been played after the set time had elapsed (such a period of time is counted as a part of the total execution time) may be separately provided.

Next, in the user list area 203, displayed is information about a playing user on the target day. The playing user information also includes information about the anonymous user. In addition, the above-described "other play time" (e.g., an operation on a home screen (home menu), etc.) is displayed as "other record". In the example shown in FIG. 6, three playing users "user 1", "user 2", and "user 3" are displayed. In addition, "other record" is displayed below the user 3. (If the entirety of the information cannot be collectively displayed on one screen, the remaining portion of the information can be displayed by screen scrolling). As information about each user, displayed are a user image 206, a nickname 207, a game image 208 indicating a game application that the user has played on the target day (if there are a plurality of games that the user played, respective images of the games are displayed), and a user's total play time 209. A bar-type meter 201 is also displayed which indicates the proportion of each user's total play time 209 to the total play time 205. For the anonymous user, a portion where a nickname 207 is normally displayed is left blank, and a dedicated image indicating the anonymous user is displayed as a user image 206, for example (see a user image 236 in FIG. 8 described below).

The total of play times of the respective users displayed in the user list area 203 is not always equal to the total play time 205. This is because, for example, when one game is synchronously played by two players, the play times of the two players are not counted separately for the display of the total play time 205. For example, it is assumed that a game has been played by the user 1 alone for 10 minutes, and thereafter, the game has been played by the user 1 and the user 2 synchronously for 10 minutes. In this case, the play time of the user 1 is 20 minutes in total, and the play time of the user 2 is 10 minutes in total, which are displayed in the user list area. The total of these play times is 30 minutes. Meanwhile, the total play time 205 is counted as 20 minutes, but not 30 minutes. In other words, the total play time 205 is counted as a total time during which a game has been played, irrespective of whether the game has been played by one player or two players.

Figure 7:
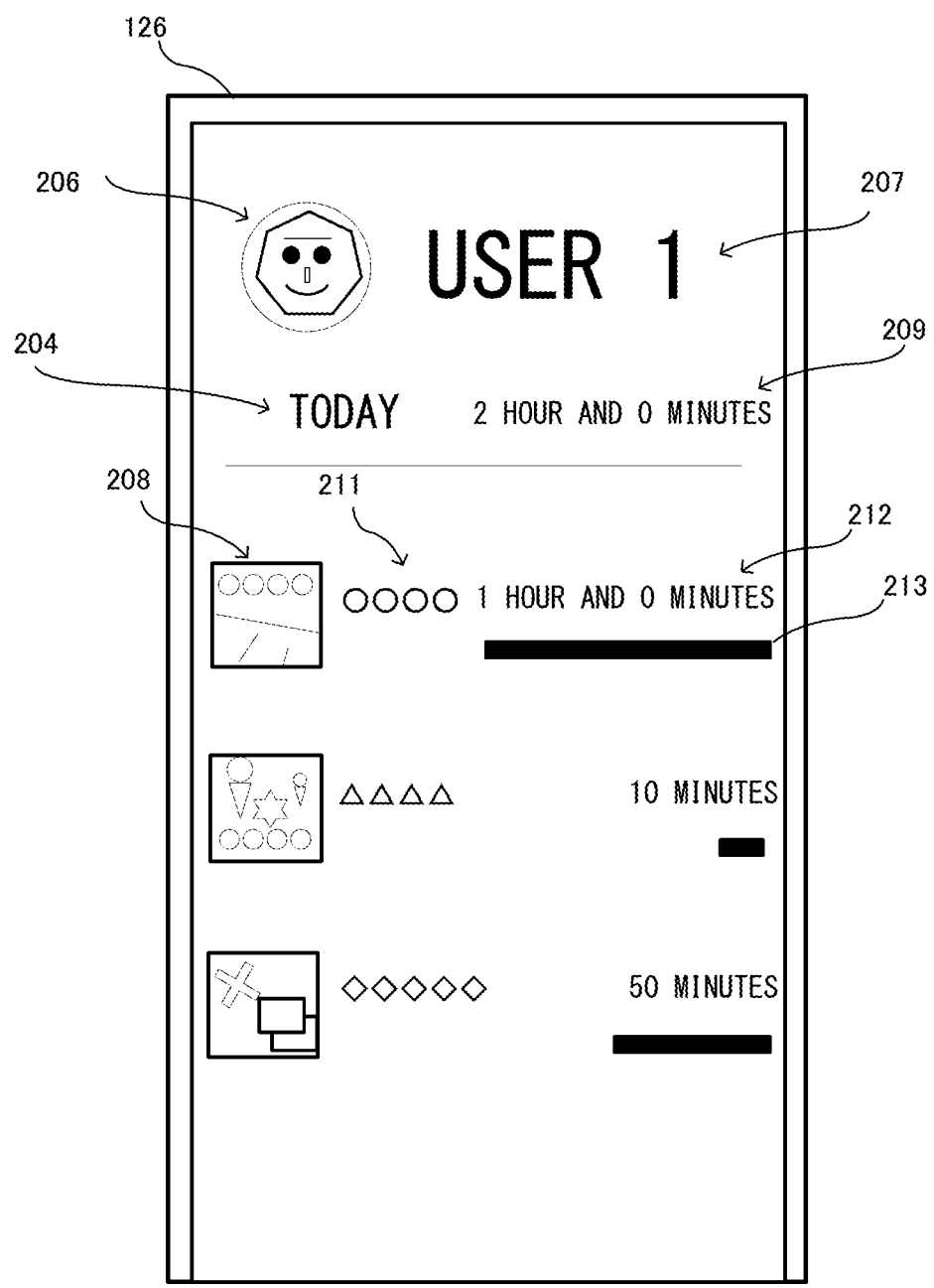
FIG. 7 shows a non-limiting example of a screen of the smartphone 102.

When, in the user list area 203, a touch operation, etc., is performed on, for example, the user image 206 or the nickname 207 of one of the users, a user details screen as shown in FIG. 7 is displayed. FIG. 7 shows a non-limiting example of the detailed screen of the user 1 in FIG. 6. In FIG. 7, the user image 206 and the nickname 207 of the user 1, the target day 204, and the total play time 209 of the user 1 are displayed in an upper portion of the screen. A list of game information and play times of individual games is displayed below the upper portion of the screen. Specifically, a game image 208, a game title 211, and a play time 212 are displayed for each game. In addition, bars 213 each indicating a proportion with respect to a total play time are displayed, so that the ratio by which how long each game has been played is indicated, is visually understood with ease.

(Monthly Screen)

Figure 8:
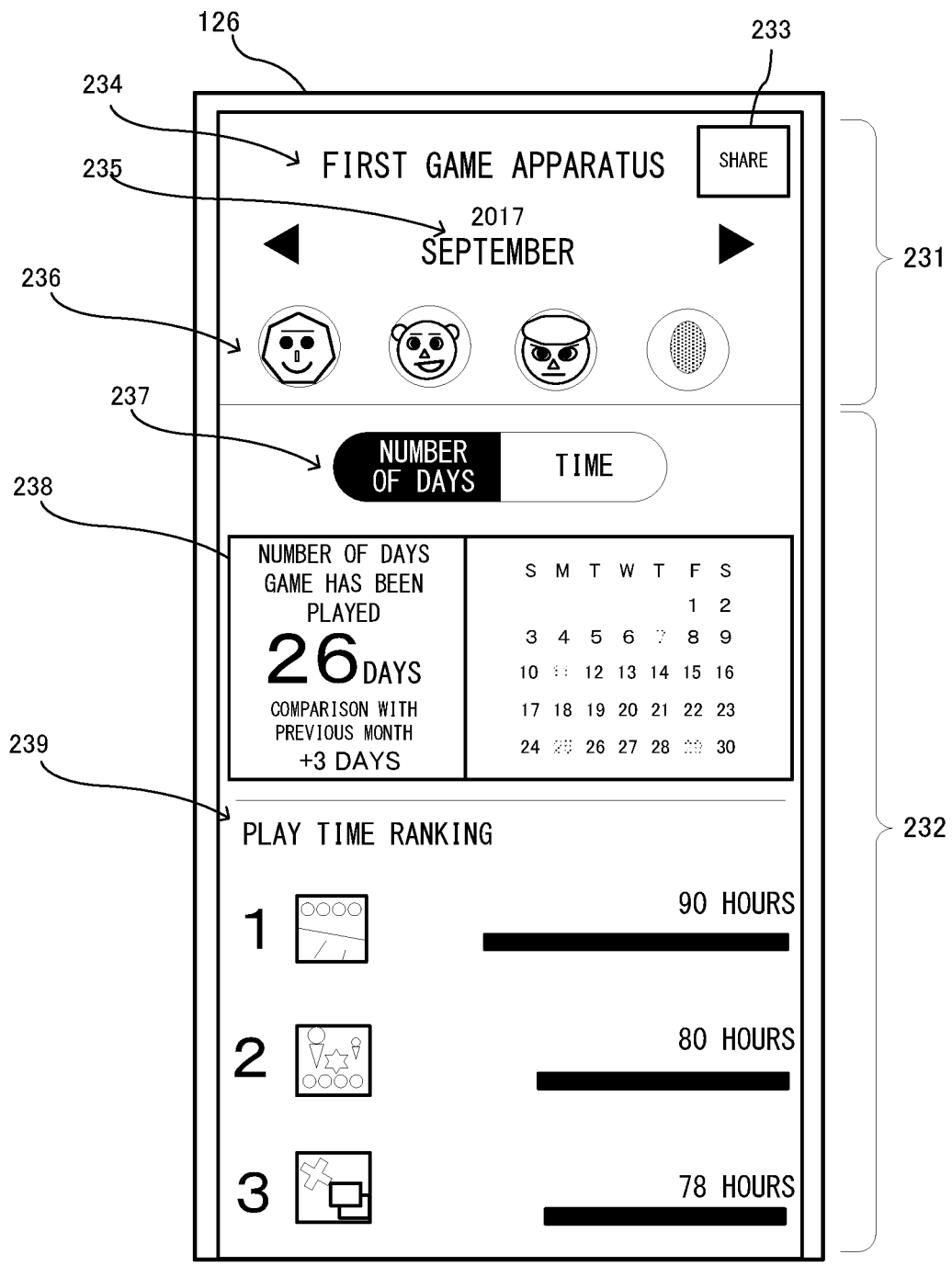
FIG. 8 shows a non-limiting example of a screen of the smartphone 102.

Next, an exemplary screen indicating the execution state in a monthly format will be described. FIG. 8 shows a non-limiting example of a display screen in a monthly format. In FIG. 8, the screen includes a target apparatus information area 231 and a detailed information area 232. In the target apparatus information area 231, displayed are a share button 233, a name-of-game-apparatus-to-be-displayed 234, a target year-and-month 235, and a plurality of user images 236. In the present embodiment, in the dedicated application, a plurality of target game apparatuses the play states of which are to be checked can be registered. Therefore, the name-of-game-apparatus-to-be-displayed 234 indicates which of the game apparatuses 101 is the current target to be displayed. The target year-and-month 235 indicates a target year and month to be displayed. Months displayed can be changed using left and right change buttons.

The user images 236 indicate user images (playing users) that are registered in the target apparatus to be displayed. In FIG. 8, the rightmost image is a dedicated image indicating an anonymous user. In addition, the user images 236 can be used to narrow (filtering) display data for each user. For example, in the default setting, data related to all users whose user images 236 are displayed is displayed in the detailed information area 232 described below. By touching one of the user images 236, data related to the selected user can be displayed in the detailed information area 232.

The share button 233 is for sharing information displayed on the screen with another specific user. For example, when the button is touched, information displayed on the screen is transmitted to a predetermined destination through an E-mail, an SNS, etc. For example, the share button is provided so that both parents can share information about the play state of their child.

In the detailed information area 232, displayed are a change button 237, summary information 238, and ranking information 239. The change button 237 is for changing the display contents of the summary information 238 and the ranking information 239 between those based on the "number of days" and those based on the "time". When the "number of days" is selected, the number of days on which the game apparatus 101 was played in the target month even if the time period in which the game apparatus 101 was played was short (in other words, days on which the game apparatus 101 was not played at all are not counted) is displayed in the summary information 238, for example. Furthermore, a calendar is also displayed so that days on which the game apparatus 101 was played are colored so as to be recognized at a glance. In the ranking information 239, displayed are the rankings of games in terms of total play time in the target month. In the example shown in FIG. 8, game images, total play times, and bars representing the proportions are displayed as one set of game information in order starting from the first rank. The above "other record" (other play time) may be displayed with the rankings.

Figure 9:
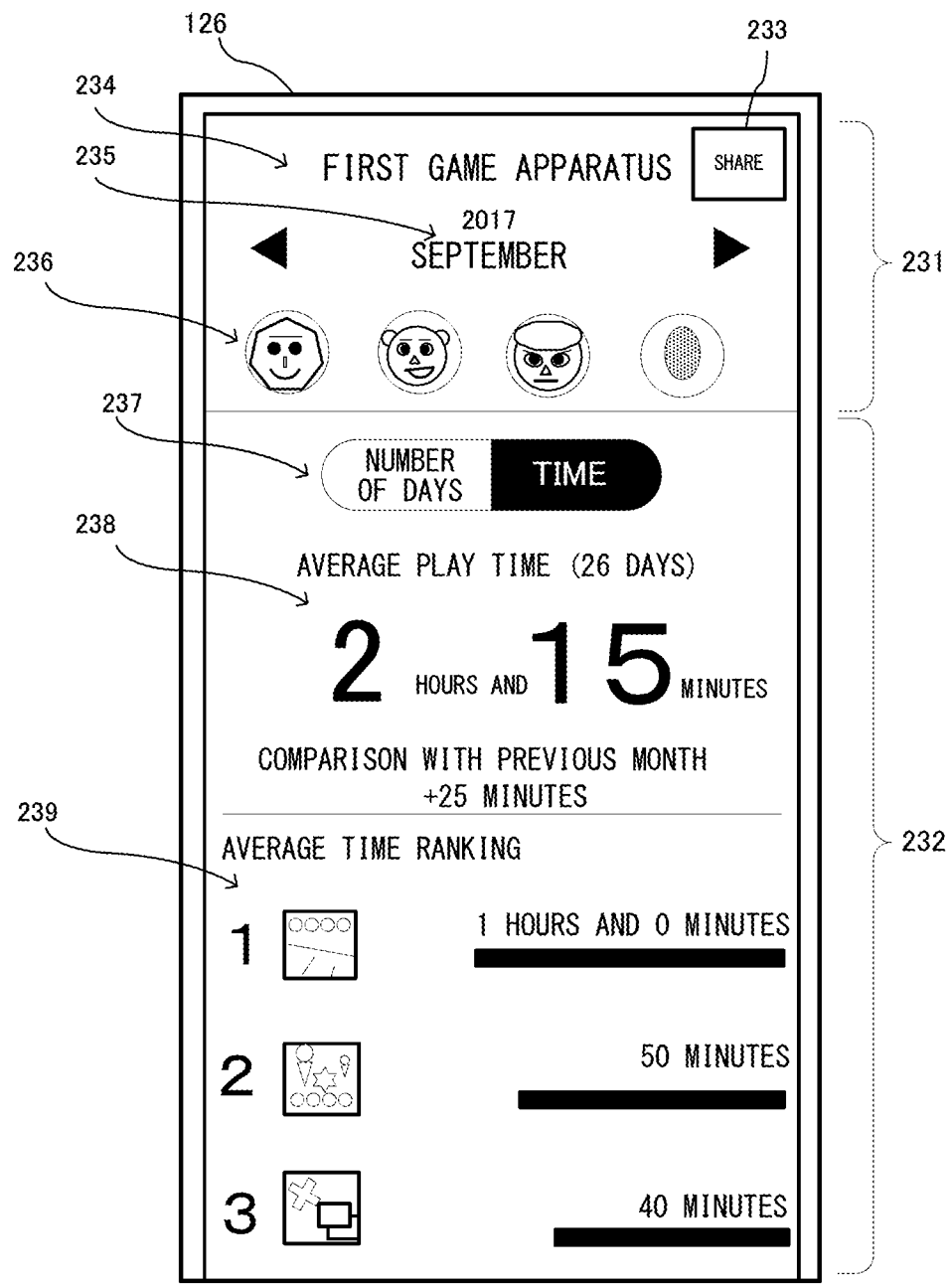
FIG. 9 shows a non-limiting example of a screen of the smartphone 102.

When the "time" is selected by the change button 237, information about an average play time is displayed. FIG. 9 shows a non-limiting example of a screen that is displayed when the "time" is selected. In this case, in the summary information 238, displayed is information indicating an average play time in the target month and a comparison with the previous month. In the ranking information 239, displayed is a ranking in terms of average play time. While the average play time is displayed in the present embodiment, the total play time may be simply displayed instead of the "average" play time in another embodiment.

Thus, in the present embodiment, parental control is set in the game apparatus 101, and the play state of each of a plurality of users registered in the game apparatus 101 can be displayed on the smartphone 102. Here, conventionally, while the total play time can be displayed for each game apparatus, the play state cannot be indicated for each user. In this regard, in the present embodiment, the play state can be indicated for each user in more detail, including what game has been played by each user and how long the game has been played by the user, etc. For example, the parent can know his/her child's game preference, etc.

Next, an information processing operation in the present embodiment will be described with reference to FIGS. 10 to 21 in more detail. Various processes that are not directly involved in the above processes of acquiring and displaying the play state, will not be described in detail.

Firstly, various kinds of data used in the present embodiment will be described. Data in the game apparatus 101, data in the server 103, and data in the smartphone 102 will be separately described.

(Data Used in Game Apparatus 101)

Figure 10:
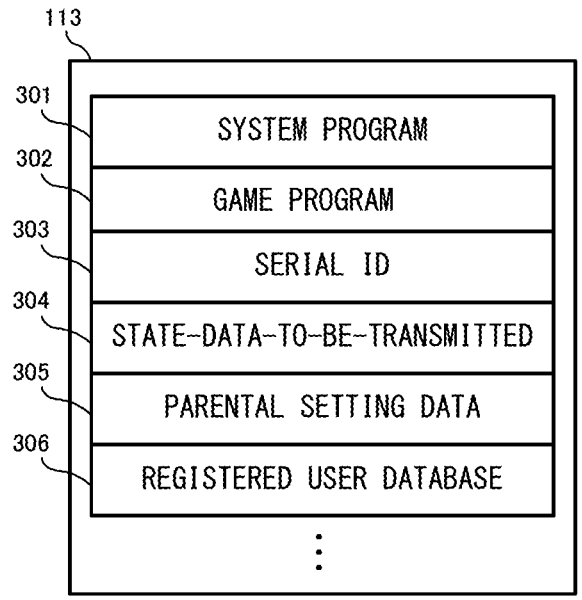
FIG. 10 shows a non-limiting example of a program and information stored in a main memory 113 of the game apparatus 101.

Firstly, main data used in the game apparatus 101 will be described. FIG. 10 shows a non-limiting example of a memory map of the main memory 113 of the game apparatus 101. In the game apparatus 101, various programs and various kinds of data stored in the internal storage device 112 are loaded into the main memory 113 as appropriate so that various processes can be executed. In FIG. 10, the main memory 113 stores a system program 301, a game program 302, a serial ID 303, state-data-to-be-transmitted 304, parental setting data 305, and a registered user database 306, etc.

The system program 301 is for controlling the entire game apparatus 101. For example, the processes of displaying a home screen (home menu) and receiving operations performed on the home screen are carried out by execution of the system program 301. For the sake of convenience of description, in the present embodiment, it is assumed that all processes other than a game process executed by a game application being activated are basically executed by the system program 301. The above system processes are based on activation and execution of the system program 301.

The game program 302 is for executing a game process. For example, the game program 302 is a predetermined game program, among a plurality of game programs stored in the internal storage device 112, which is loaded in the main memory 113. Only one game program can be loaded in the main memory 113 and executed at a time. The above game process is based on activation and execution of the game program 302. The game program 302 is, for example, available by purchasing and downloading, etc. The game program 302 may be installed from an external storage medium, such as a memory card or an optical disc.

The serial ID 303 is for uniquely identifying the game apparatus 101.

Figure 11:
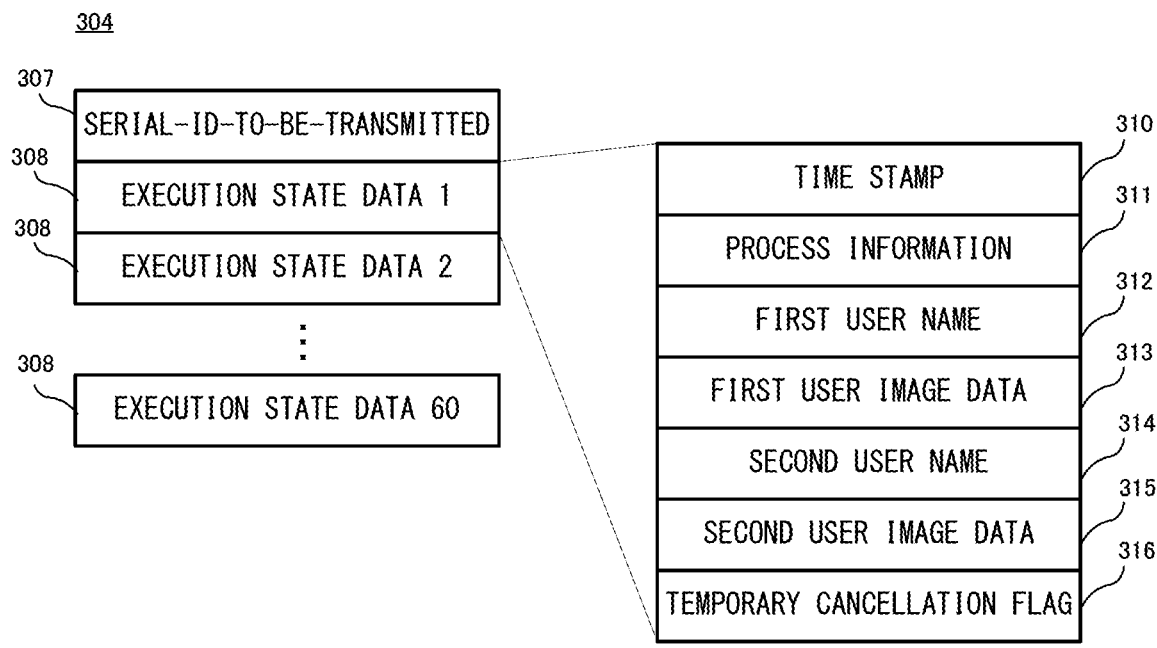
FIG. 11 shows a non-limiting example of a data structure of state-data-to-be-transmitted 304.

The state-data-to-be-transmitted 304 indicates a play state (the execution state of an application) in the game apparatus 101, and is transmitted to the server 103. FIG. 11 shows a non-limiting example of a data structure of the state-data-to-be-transmitted 304. The state-data-to-be-transmitted 304 includes a serial-ID-to-be-transmitted 307 and 60 pieces of execution state data 308. In the present embodiment, a piece of execution state data 308 is generated at intervals of 10 seconds, and 60 pieces of execution state data 308 (data acquired during 10 minutes) are collectively transmitted to the server 103 at intervals of 10 minutes. Therefore, in the present embodiment, 60 pieces of execution state data 308 are prepared. In another embodiment, the number of pieces of execution state data 308 may be changed as appropriate, depending on the transmission interval or the data acquisition interval.

Each piece of execution state data 308 includes a time stamp 310, process information 311, a first user name 312, first user image data 313, a second user name 314, second user image data 315, and a temporary cancellation flag 316.

The time stamp 310 is data (date and time, date, time, etc.) indicating when the execution state data 308 has been generated (in other words, when the information has been acquired). The process information 311 is related to a process that was being executed in the foreground at that time. In other words, the process information 311 indicates what game was being executed in the foreground at that time. If the home screen was being operated instead of a game, the process information 311 indicates that the foreground process is a system process. For example, the process information 311 includes a process type indicating whether the foreground process is a game process or a system process, and an application ID indicating an application that was being executed in the foreground.

The first user name 312, the first user image data 313, the second user name 314, and the second user image data 315 are data of nicknames and user images of users which have been used in a game process at the time of acquisition of information. In the present embodiment, the maximum number of users who can synchronously play is two, and therefore, data for two users is the maximum. If only one user is playing at the time of acquisition of information, the information of that user is set as the information of the first user, and null data is set as the information of the second user. If a system process is being executed, or a game process is being executed without selection of a user, the information of the "anonymous user" is set as the information of the first user.

The temporary cancellation flag 316 is data indicating whether or not parental restriction is temporarily cancelled.

Returning to FIG. 10, the parental setting data 305 is for parental control in the game apparatus 101. The parental setting data 305 includes, for example, information about a time range during which a game can be played, as described above. The parental setting data 305 also includes information indicating whether or not parental restriction is temporarily canceled. In another embodiment, the parental setting data may be stored in the server 103 instead of the game apparatus 101. For example, when the game apparatus 101 is activated, the game apparatus 101 may communicate with the server 103 to receive the setting contents, and perform a setting process.

The registered user database 306 is information about the users registered in the game apparatus 101. The registered user database 306 includes nicknames, user image data, etc.

(Data Used in Server 103)

Figure 12:
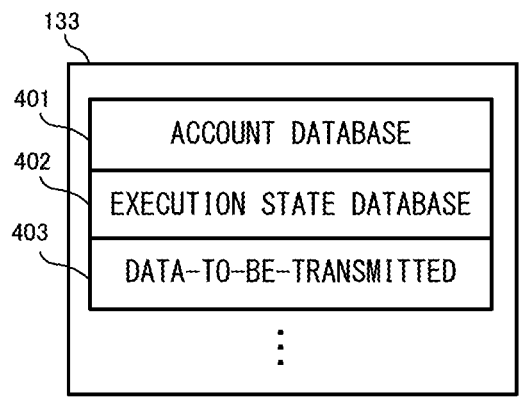
FIG. 12 shows a non-limiting example of a program and information stored in a main memory 133 of the server 103.

Next, main data used in the server 103 will be described. FIG. 12 shows a non-limiting example of a program and data stored in the main memory 133 of the server 103. The main memory 133 stores an account database 401, an execution state database 402, and data-to-be-transmitted 403. In addition, although not shown, the main memory 133 stores a server program and various kinds of work data, etc., for execution of a process in the server 103, as appropriate.

Figure 13:
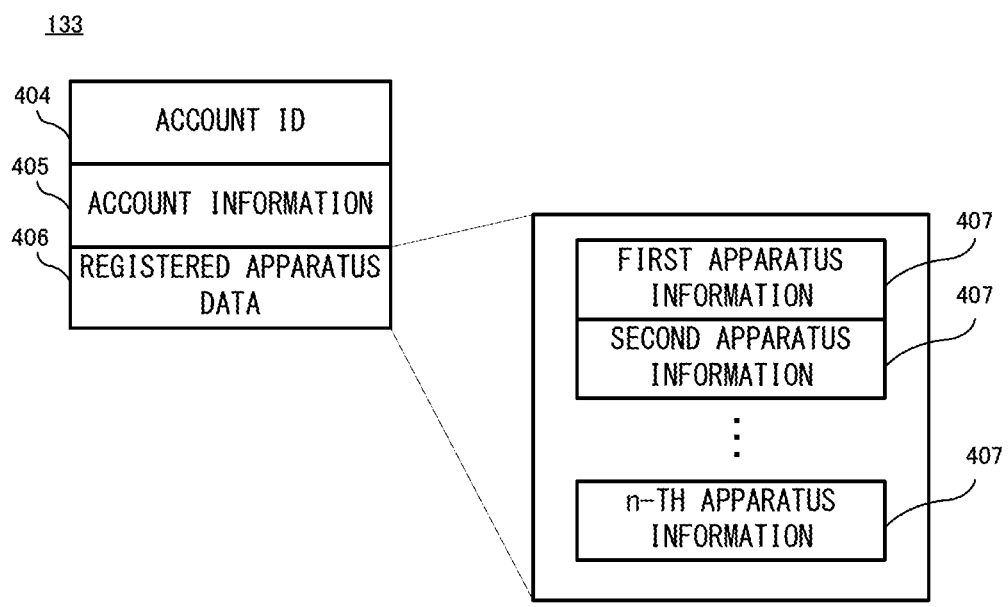
FIG. 13 shows a non-limiting example of a data structure of an account database 401.

The account database 401 is a set of account information for using a dedicated application installed in the smartphone 102. In other words, the account database 401 is user information of the dedicated application. The account database 401 is used in a log-in process of the dedicated application. As shown in FIG. 13, information included in the account database 401 includes an account ID 404, account information 405, and registered apparatus data 406. The account ID 404 is for uniquely identifying the account. The account information 405 is a password, an E-mail address, etc. The registered apparatus data 406 includes a plurality of pieces of apparatus information 407 for identifying game apparatuses 101 the states of which are to be checked by using the account. Each piece of apparatus information 407 includes a serial ID, apparatus name (which can be optionally set by a user), network address information, etc., of the corresponding game apparatus 101.

Returning to FIG. 12, the execution state database 402 is data generated by aggregating the state-data-to-be-transmitted 304 (the execution state data 308 included therein) transmitted from the game apparatus 101. FIG. 14 shows a non-limiting example of a structure of the execution state database 402. In FIG. 14, the execution state database 402 includes apparatus serial IDs 421 and aggregate data 422. The apparatus serial IDs 421 are each a serial ID of the corresponding game apparatus 101. The aggregate data 422 is obtained by aggregating the state-data-to-be-transmitted 304 and is tabulated. FIG. 15 shows a non-limiting example of a data structure of the aggregate data 422. The aggregate data 422 includes the following items: year-month-day 431 that is an item specifying a year, a month, and a day; user information 432; and execution state 433. As shown in FIG. 15, the aggregate data 422 includes data of a plurality of users on a daily basis. Furthermore, data of a plurality of execution states is associated with each user. For example, it is assumed that the number of playing users who played on a certain game apparatus 101 on a certain day is three. It is also assumed that the number of games which were played on that day is four. In this case, that day is associated with the names and image data of the three users. For each user, process information indicating a game played on that day, etc., is associated with execution time data indicating a play time in that process information. For example, if the result of aggregating the state-data-to-be-transmitted 304 shows that a certain game application was played from 6:00 p.m. to 6:30 p.m., information specifying that game application is set in the process information and the execution time data is set in a format such as "6:00 p.m. to 6:30 p.m.". As in the case of game applications, a play time (other play times) in the system process is also aggregated, and the resultant execution time data is set as appropriate. The structure of the execution state database 402 is merely illustrative. Any database structure that can be used to know a play state of each user may be used.

Although not shown, the aggregate data 422 includes, in addition to the result of the aggregation on a daily basis as described above, the result of calculating an average play time, etc., on a monthly basis, and the result of calculating a comparison with the previous month, as appropriate. The aggregate data 422 may also include a time during which restriction has been temporarily canceled, information about downloaded software, etc. (information to be displayed in the notification area 202 in FIG. 6). Specifically, contents that may be displayed in the dedicated application (see FIGS. 6 to 9) are previously aggregated and prepared in the server 103, and the result is stored as the aggregate data 422. In other words, the aggregation result to be displayed is previously prepared in the server 103 so that the smartphone 102 need not separately perform an aggregation process.

Returning to FIG. 12, the data-to-be-transmitted 403 is to be transmitted to the smartphone 102 in response to a request. The request from the smartphone 102 includes information specifying a game apparatus 101. Based on the request, the aggregate data 422 of the specified game apparatus 101 is extracted from the execution state database 402 and is set as the data-to-be-transmitted 403.

(Data Used in Smartphone 102)

Next, main data used in the smartphone 102 will be described. FIG. 16 shows a non-limiting example of data stored in the main memory 123 of the smartphone 102. The main memory 123 stores a dedicated application program 501, account data 502, data-to-transmit-request 503, received data 504, etc.

The dedicated application program 501 is for executing a process involved in the above dedicated application. In another embodiment, instead of the dedicated application, a web program that is operated on a web browser may be used, for example.

The account data 502 is information about an account that is required when the above dedicated application is used. The account data 502 is used to log in to the server 103. The account data 502 includes an account ID, etc., and information about a password, etc.

The data-to-transmit-request 503 is used to request the server 103 to transmit the above aggregate data of a play state. The data-to-transmit-request 503 includes information that specifies a game apparatus the data of which is to be requested, information that indicates the sender, such as a network address of the sender.

The received data 504 is the data-to-be-transmitted 403 that has been received from the server 103 in response to the above request, and stored.

In addition, the main memory 123 stores data that is necessary in information processing, such as operation data indicating an operation performed on the smartphone 102, as appropriate.

Next, information processing in the present embodiment will be described in detail.

(Process in Game Apparatus 101)

Figure 17:
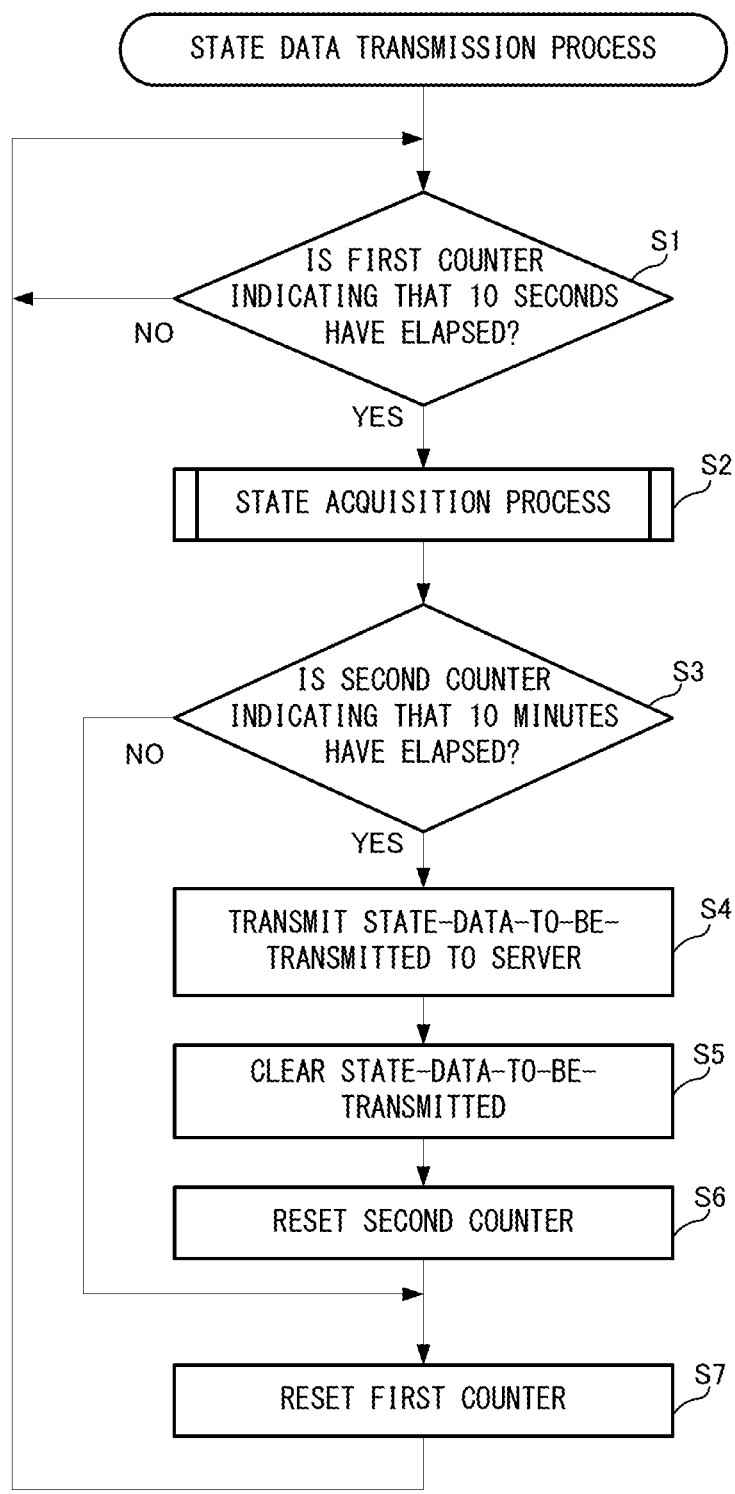
FIG. 17 is a flowchart showing in detail a non-limiting example of a state data transmission process.

Firstly, a process executed by the game apparatus 101 will be described in detail. FIG. 17 is a flowchart showing in detail a non-limiting example of a state data transmission process executed by the game apparatus 101. In this process, information about an execution state is acquired at intervals of 10 seconds and accumulated, and the accumulated information is transmitted to the server 103 at intervals of 10 minutes. This process is executed as a background process in parallel with execution of a game process (executed as a foreground process), etc. This process is based on the assumption that a plurality of users have already been registered. It is also assumed that the above process of selecting a playing user is performed as appropriate in a game process.

In FIG. 17, initially, in step S1, the processor section 111 of the game apparatus 101 determines, using a first counter, whether 10 seconds have elapsed since the previous acquisition of the execution state. Here, the first counter is for measuring a timing at which information about the execution state is acquired. If the result of the determination indicates that 10 seconds have not elapsed (NO in step S1), the determination is repeated until 10 seconds have elapsed. If 10 seconds have elapsed (YES in step S1), the processor section 111 executes a state acquisition process in the next step S2.

Figure 18:
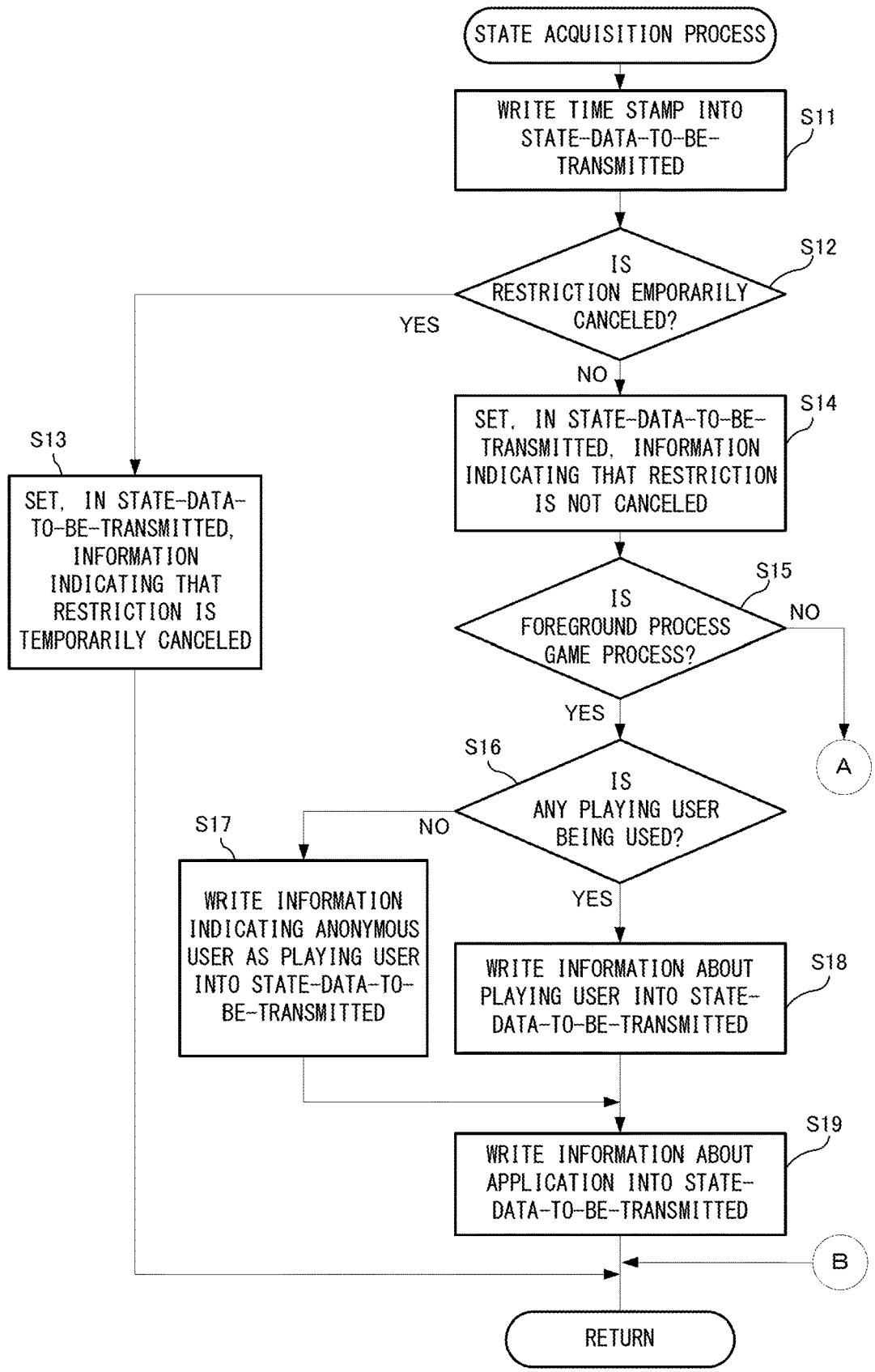
FIG. 18 is a flowchart showing in detail a non-limiting example of a state acquisition process.
Figure 19:
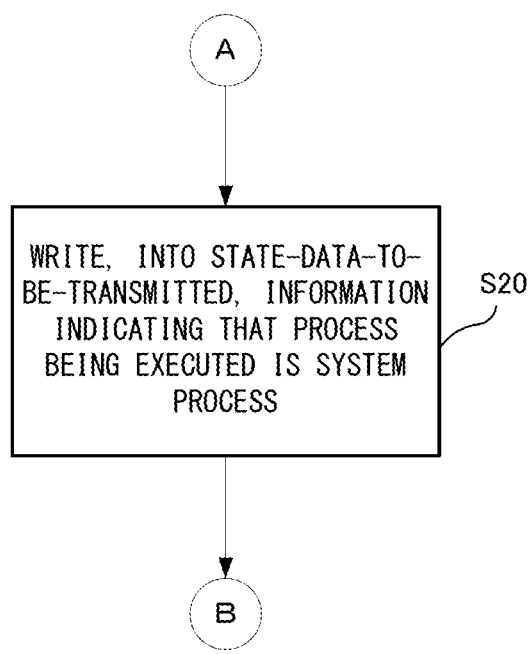
FIG. 19 is a flowchart showing in detail a non-limiting example of the state acquisition process.

FIG. 18 is a flowchart showing in detail a non-limiting example of the state acquisition process. In FIG. 18, initially, in step S11, the processor section 111 acquires and writes the current time as the time stamp 310 of the execution state data 308. Next, in step S12, the processor section 111 determines whether or not parental restriction is temporarily canceled, by referring to the parental setting data 305. If the result indicates that parental restriction is temporarily canceled (YES in step S12), the processor section 111 writes, into the temporary cancellation flag 316, information indicating that parental restriction is temporarily canceled, in step S13. As a result, the processor section 111 can know the time during which parental restriction is temporarily canceled. Then, the state acquisition process ends.

Meanwhile, if parental restriction is not canceled (NO in step S12), the processor section 111 sets, in the temporary cancellation flag 316, information indicating that parental restriction is not canceled, in step S14. Next, in step S15, the processor section 111 determines whether or not the foreground process is a game process. If the result of the determination indicates that the foreground process is a game process (YES in step S15), the processor section 111 determines whether or not any of the above playing users is being used (selected) in the game process, in the next step S16. If the result indicates that any of the above playing users is being used (YES in step S16), the processor section 111 acquires and writes a nickname and user image data of that playing user into the execution state data 308, in step S18. At that time, if the number of the playing users is one, only the first user name 312 and the first user image data 313 are written. Meanwhile, if the number of the playing users is two, the first user name 312 and the first user image data 313 are written for one user, and the second user name 314 and the second user image data 315 are written for the other user. In other words, when a plurality of users are synchronously playing a game, a play time of each user is stored.

Meanwhile, if none of the playing users is being used (NO in step S16), a game is being played without a playing user having been selected at the start of the game, for example. In this case, in step S17, the processor section 111 writes information indicating the anonymous user as a playing user into the first user name 312 and the first user image data 313 of the execution state data 308 (information about the second user is null). For example, the "anonymous user" is written as the first user name, and previously prepared image data dedicated to the anonymous user is written as an image of the anonymous user.

Next, in step S19, the processor section 111 writes, into the process information 311, information (an application ID, etc.) about a game application that is executing the game process. For example, in the case where game software is downloaded from a predetermined server to the game apparatus 101, when the downloading has been completed, information (the title of the game, etc.) about the downloaded game software may be acquired and incorporated into the process information 311. In other words, the action of downloading game software is handled as a portion of the execution state. Then, the state acquisition process ends.

In another embodiment, information about the downloaded game software may be transmitted as data different from the execution state data 308 to the server 103 at the timing of completion of downloading, instead of being incorporated into the process information 311. In the server 103, this data may be stored in the execution state database 402 in association with a game apparatus 101 that is the sender of the data, and may be transmitted to the smartphone 102 as appropriate.

Meanwhile, if the result of the determination in step S15 indicates that the foreground process is not a game process (NO in step S15), the following process is executed because the foreground process is a system process. Specifically, in step S20 in FIG. 19, the processor section 111 writes, into the process information 311, information indicating that the process which is being currently executed in the foreground is involved in a system process. Information about the user is not set. As a result, a time during which a system process is executed in the foreground can be counted as "other play time". Then, the state acquisition process ends.

Returning to FIG. 17, in the next step S3, the processor section 111 determines, using a second counter, whether or not 10 minutes have elapsed since the previous transmission of the state-data-to-be-transmitted 304 to the server 103. Here, the second counter is for measuring a timing at which the state-data-to-be-transmitted 304 is transmitted to the server 103. If the result of the determination indicates that 10 minutes have not elapsed (NO in step S3), the process is advanced to step S7 described below. Meanwhile, if 10 minutes have elapsed (YES in step S3), the processor section 111 writes the serial ID 303 of the game apparatus 101 into the serial-ID-to-be-transmitted 307 of the state-data-to-be-transmitted 304 in step S4. Thereafter, the state-data-to-be-transmitted 304 is transmitted to the server 103. Specifically, the execution state data 308, accumulated for 10 minutes (60 pieces of execution state data), to which the serial ID 303 of the game apparatus 101 is added is transmitted to the server 103.

Next, in step S5, the processor section 111 clears the state-data-to-be-transmitted 304. In the following step S6, the processor section 111 resets the second counter. Furthermore, in step S7, the processor section 111 resets the first counter. Thereafter, the process is returned to step S1 and the process is repeated. The description of the state data transmission process is ended.

(Process in Server 103)

Figure 20:
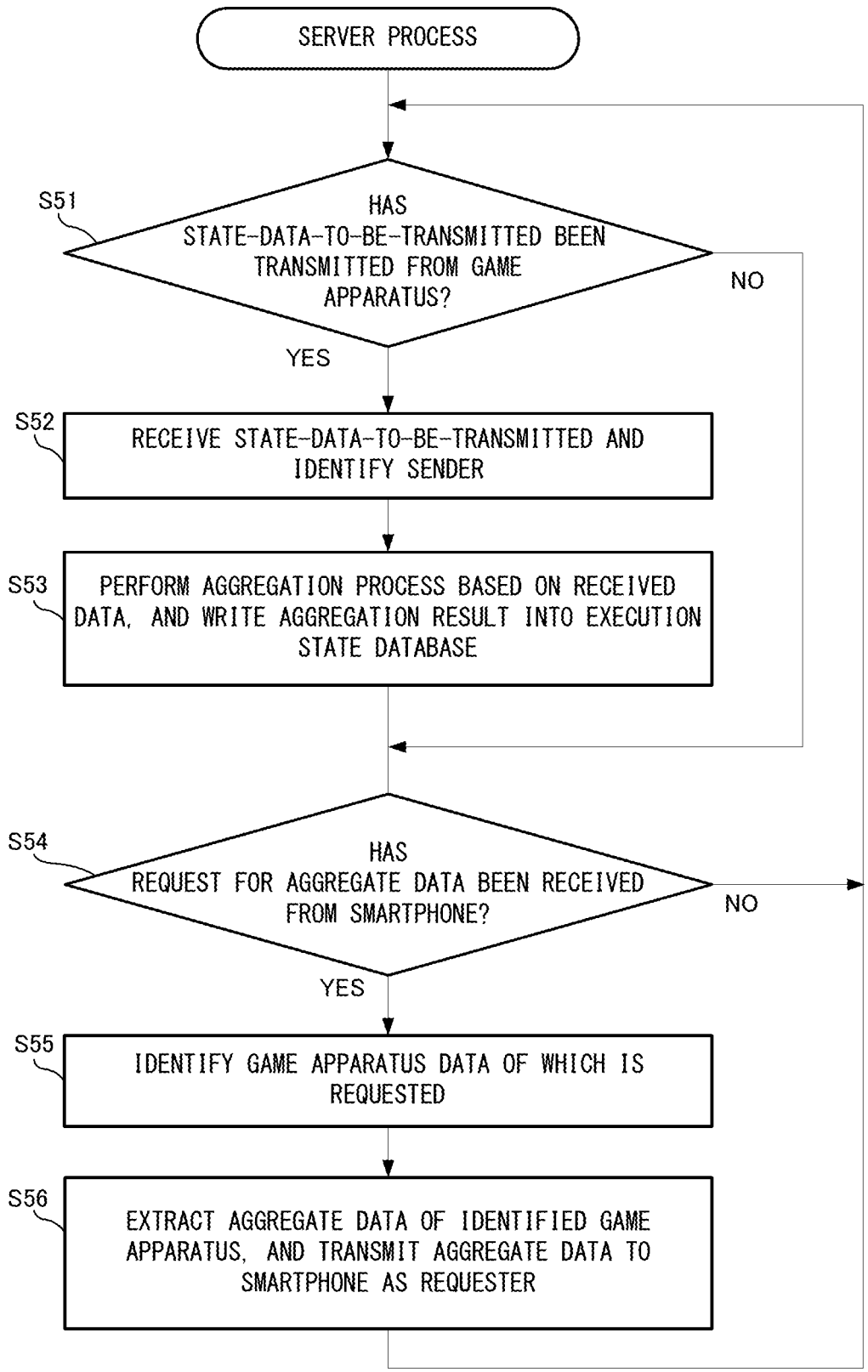
FIG. 20 is a flowchart showing in detail a non-limiting example of a server process.

Next, information processing in the server 103 will be described. FIG. 20 is a flowchart showing in detail a non-limiting example of a server process executed by the server 103. Initially, in step S51, the processor section 131 of the server 103 determines whether or not the state-data-to-be-transmitted 304 has been transmitted from the game apparatus 101. If the result of the determination indicates that the state-data-to-be-transmitted 304 has not been transmitted from the game apparatus 101 (NO in step S51), the process is advanced to step S54 described below. Meanwhile, if the state-data-to-be-transmitted 304 has been transmitted from the game apparatus 101 (YES in step S51), the processor section 131 receives the state-data-to-be-transmitted 304, and identifies a game apparatus 101 that is the sender, on the basis of the serial-ID-to-be-transmitted 307 included in the state-data-to-be-transmitted 304, in step S52. Furthermore, in step S53, the processor section 131 executes an aggregation process on the basis of the received state-data-to-be-transmitted 304. In the aggregation process, play times are aggregated for each user (including the anonymous user), and play times are aggregated for each application and for each user. In addition, various numerical values that may be displayed in a dedicated application, such as an aggregate of "other play times", an aggregate of times during which restriction was temporarily canceled, an average play time in each month, and a comparison with the previous month, are calculated. In addition, for example, downloaded software is checked as a part of the aggregation process. Thereafter, these calculation results are used to execute a process of generating the aggregate data 422. Thereafter, the processor section 131 writes information based on the aggregation result into the execution state database 402.

Next, in step S54, the processor section 131 determines whether or not a request to transmit aggregate data has been received from the smartphone 102 (the data-to-transmit-request 503 has been transmitted). If the request has not been received (NO in step S54), the process is returned to step S51 and the process is repeated. If the request has been received (YES in step S54), the processor section 131 identifies a game apparatus 101 the data of which is requested, on the basis of information contained in the received request, in step S55. In the following step S56, the processor section 131 extracts the aggregate data 422 associated with the identified game apparatus 101 from the execution state database 402. For example, the processor section 131 also acquires apparatus information such as an apparatus name, about the identified game apparatus 101, with reference to the account database 401, as appropriate. Thereafter, the processor section 131 sets the extracted aggregate data and the apparatus information as the data-to-be-transmitted 403, and transmits the data-to-be-transmitted 403 to the smartphone 102, which is the requester. Thereafter, the process is returned to step S51 and the process is repeated. The description of the server process is ended.

(Process in Smartphone 102)

Figure 21:
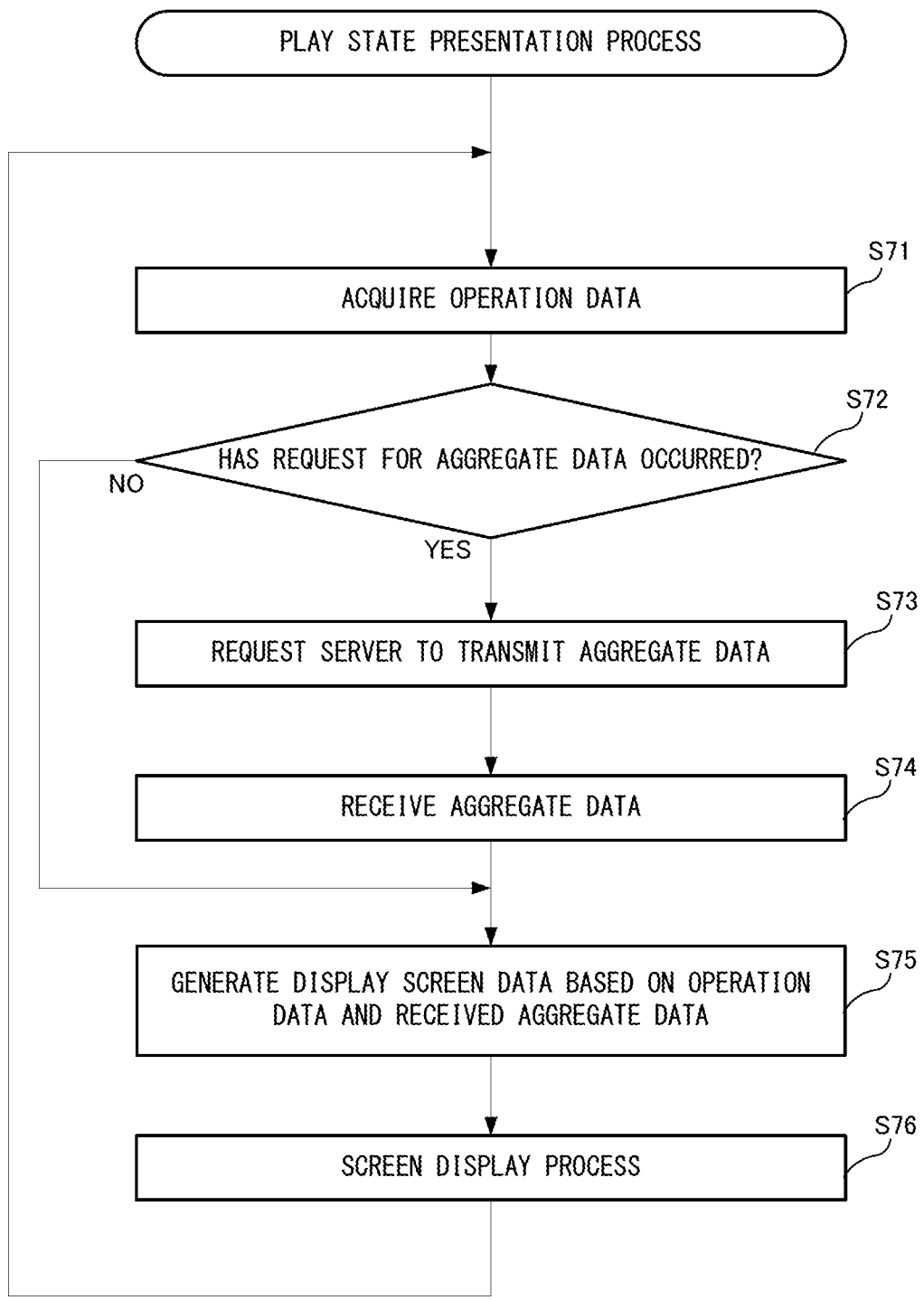
FIG. 21 is a flowchart showing in detail a non-limiting example of a play state presentation process.

Next, information processing in the smartphone 102 will be described. FIG. 21 is a flowchart showing in detail a non-limiting example of a play state presentation process executed by the above dedicated application. It is assumed that, before the start of that process, the log-in process to the server 103 has already been performed. In FIG. 21, initially, in step S71, the processor section 121 of the smartphone 102 acquires operation data. Next, in step S72, the processor section 121 determines whether or not a request for the aggregate data 422 has occurred. A request for the aggregate data 422 occurs, for example, at a timing of data updating operation (pressing an update button, etc.) by the user, or when data is automatically updated at the time of activation of the dedicated application, etc. If the result of the determination indicates that a request for the aggregate data 422 has not occurred (NO in step S72), the process is advanced to step S75 described below. Meanwhile, if a request for the aggregate data 422 has occurred (YES in step S72), the processor section 121 requests the server 103 to transmit aggregate data in step S73. Specifically, the processor section 121 incorporates, into the data-to-transmit-request 503, information for specifying a game apparatus 101 whose aggregation data is requested, and information such as an account ID and network address of the smartphone 102, and transmits the resultant data-to-transmit-request 503 to the server 103. In response to this, the server 103 transmits, to the smartphone 102, the aggregate data 422 associated with the game apparatus 101 whose aggregate data is requested.

Next, in step S74, the processor section 121 receives the aggregate data 422 transmitted from the server 103.

Next, in step S75, the processor section 121 generates data of various display screens as described above with reference to FIGS. 6 to 9, on the basis of operation data and the received aggregate data. Specifically, screen data for displaying a screen that allows a game play time to be recognized for each user, a screen that allows a play time to be recognized for each user and for each game application, etc., is generated according to an operation performed by the user of the smartphone 102. In addition, the processor section 121 executes other processes according to operations, as appropriate. For example, when the share button 233 is pressed, a process of transmitting information based on the aggregate data at that time or image data based on the screen data to a predetermined destination by E-mail, or a process of posting such information to an SNS, is executed as appropriate.

Next, in step S76, the processor section 121 displays, on the display section 126, a screen for displaying a play state on the basis of the display screen data generated in step S75. Thereafter, the process is returned to step S71 and the process is repeated. The description of the play state presentation process is ended.

The detailed description of the processes according to the present embodiment is ended.

Thus, in the present embodiment, play states on the game apparatus 101 in which a plurality of users can be registered are presented on the smartphone 102 such that a play state can be recognized for each registered user. This allows a play state for each user to be recognized in more detail. For example, a parent can know what game was played for a longer period of time, etc., and therefore, can know his/her child's game preference, etc. In addition, for example, when a game has been played after elapse of a time limit set by parental control, the parent can know which of the users did such a thing. A parent can also be notified of information about downloaded software, and therefore, can know what game was obtained by his/her child, and whether or not downloading was done without parent's permission, for example. Such play state information can be shared with another user using the share button 233. Such play state information can also be used as a material for promoting communication between husband and wife, for example.

(Modification)

The following function may be provided for the above parental control. In the above embodiment, in the game apparatus 101, when a time limit set as parental control is reached, an alarm message is displayed, or a game process is temporarily stopped and a stop message is displayed. The system may be configured to have a function that can temporarily disable the function of displaying the alarm message and the function of stopping a game.

Specifically, in the above dedicated application, an on/off switch represented by, for example, "alarm is off today only" is provided on a screen for setting parental control on the game apparatus 101. When a parent turns the switch on, a command indicating that the switch is on is transmitted to the game apparatus 101 through the server 103. The game apparatus 101 executes, when receiving this command, a setting process of stopping displaying of the above alarm message or stop message until 11:59 p.m. on the target day. As a result, by such a simple operation, displaying of the above alarm message, etc., can be stopped for a special day, such as the child's birthday.

Furthermore, usage guidance on the above "alarm is off today only" function may be provided. The above system may be provided with a function of introducing that function at a timing when the use of the "alarm is off today only" function appears to be convenient. Specifically, in the game apparatus 101, when the above alarm message or stop message is displayed "for the first time", information indicating the function is transmitted as a push notification to the smartphone 102 through the server 103 (i.e., the push notification is provided only once for the first time). The display of the push notification is accompanied by a text for introducing the "alarm is off today only" function. Furthermore, when a tap operation is performed in response to the push notification, the above dedicated application may be automatically activated so that a screen for setting the "alarm is off today only" function is displayed.

Furthermore, a restriction may be set on a time range during which the above push notification is performed. For example, the push notification may be provided from the server 103 to the smartphone 102 only when the above alarm message or stop message is displayed on the game apparatus 101 at a time between 6:00 a.m. and 9:00 p.m., and a notification thereof is also provided from the game apparatus 101 to the server 103 at a time between 6:00 a.m. and 9:00 p.m. Therefore, even when the alarm message, etc., is displayed on the game apparatus 101 before 9:00 p.m., if the game apparatus 101 is temporarily offline before being online at and after 9:00 p.m., the notification is not provided from the game apparatus 101 to the server 103. Furthermore, even when the notification is provided from the game apparatus 101 to the server 103 before 9:00 p.m., if the server 103 receives the notification at and after 9:00 p.m., the push notification is not provided from the server 103 to the smartphone 102. This is because the purpose of the "alarm is off today only" function is taken into consideration. For example, even when the above push notification is provided to the smartphone 102 at 9:00 p.m., the "alarm is off today only" function becomes rather meaningless because the day ends at 11:59 p.m. Therefore, it is considered that the above introduction at that timing would not be very effective, and therefore, a time limit is set on the push notification as described above.

Figure 22:
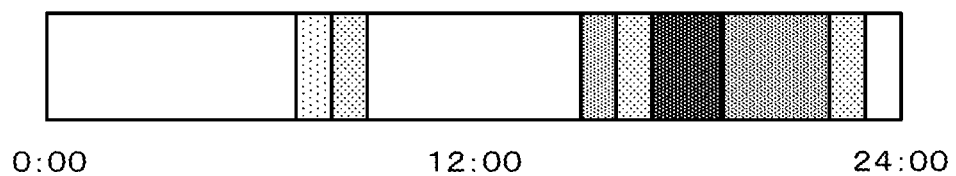
FIG. 22 shows a non-limiting example of a heat map.

In another embodiment, display of a play state on the smartphone 102 may include the so-called "heat map". For example, time ranges during which a game has been played may be displayed in a heat map format. FIG. 22 shows a non-limiting example of a heat map displayed. The example of the heat map in FIG. 22 indicates that the darker the color of a time range is, the more frequently a game has been played in the time range. As a result, it can be easily recognized, at a glance, that game play has been more frequently performed in that time range.

In the above embodiment, the aggregation process including calculation of an average play time, etc., is performed in the server 103. In another embodiment, the aggregation process may be performed in the smartphone 102.

In still another embodiment, the above system may not include the server 103. Specifically, the aggregation process performed by the server 103 and various kinds of data stored in the server 103 may be implemented by the game apparatus 101 or the smartphone 102. In addition, the game apparatus 101 and the smartphone 102 may communicate with each other through, for example, a home LAN to execute processes of transmitting and receiving the above various data.

In the above embodiment, of all registered users, only playing users (users who have played on the game apparatus 101 even if the game play time is short) are displayed in the above dedicated application. In another embodiment, the play states of all users registered in the game apparatus 101 including users who have not played at all may be displayed.

In still another embodiment, when there is a day on which no game play was performed on the game apparatus 101, information indicating such a fact may be transmitted to the server 103. Specifically, information indicating that game play has not been performed for a certain period of time may be regularly transmitted from the game apparatus 101 to the server 103. Then, the smartphone 102 may be notified of information indicating that "no game play has been performed".

While the exemplary embodiments have been described in detail, the foregoing description is in all aspects illustrative and not restrictive. It will be understood that numerous other modifications and variations can be devised without departing from the scope of the embodiments.

What is claimed is:

1. An information processing system comprising a server, a game apparatus, and an information processing apparatus, wherein
   the game apparatus includes a first memory, first communication circuitry, and a first processor and the first processor is configured to at least:
      control to store, in the first memory, according to a registration operation, user information for each of one or more respective users of the game apparatus;
      execute a game program;
      periodically generate game play state data for a game process of the executing game program in which game program information, including at least identification information for identifying the executing game program, is associated with the user information stored in the first memory for one or more users using the game program; and
      control to transmit, via the first communication circuitry, the periodically generated game play state data to the server,
   the server includes second communication circuitry and a second processor, wherein the second processor is configured to at least:
      control receive the game play state data transmitted from the game apparatus;
      generate aggregate data including, for each of the one or more users using the game program, a game play state of the game program; and
      control to, in response to a request from the information processing apparatus, transmit the aggregate data to the information processing apparatus, and
   the information processing apparatus includes third communication circuitry and a third processor, wherein the third processor is configured to:
      control to request the server to transmit the aggregate data;
      control to receive the aggregate data transmitted from the server; and
      control to display, based on the received aggregate data, the game play state of the game program for each of the one or more users.

2. The information processing system according to claim 1, wherein
   the first memory of the game apparatus further stores a plurality of game programs,
   the first processor of the game apparatus is configured to selectively execute any of the plurality of game programs, and
   the third processor of the information processing apparatus is configured to control to display the game play state for each of the one or more users and for each executed game program.

3. The information processing system according to claim 1, wherein
   the first processor of the game apparatus is configured to, based on two or more users using a same game program, periodically generate respective game play state data for each of the two more users.

4. The information processing system according to claim 1, wherein the game program is capable of use by an anonymous user other than any user having user information stored in the first memory, and
   the first processor of the game apparatus is configured to, based on the anonymous user using the game program, generate game play state data in which game program information is associated with anonymous user information.

5. The information processing system according to claim 1, wherein
   the first processor of the game apparatus is configured to:
      set a restriction on an execution allowable time of the game program in the apparatus,
      temporarily cancel the restriction based on a restriction canceling input, and
      based on the restriction being temporarily canceled, generate game play state data including information indicating the temporary canceling of the restriction,
   the second processor of the server is configured to aggregate a time during which the restriction is temporarily canceled, and
   the third processor of the information processing apparatus is configured to control to display information about the time during which the restriction is temporarily canceled.

6. The information processing system according to claim 1, wherein
   the first processor of the game apparatus is configured to control to receive and store another game program, and generate game play state data including game program information including a title of the other game program, and
   the third processor of the information processing apparatus is configured to control to display information about the other game program.

7. The information processing system according to claim 1, wherein
   the first processor of the game apparatus is configured to, when a system process other than the game program is executed as a foreground process, generate system process execution state data for an execution state of the system process, and
   the third processor of the information processing apparatus is configured to control to display information about the execution state of the system process.

8. The information processing system according to claim 1, wherein
the game play state comprises a game play time.

9. The information processing system according to claim 8, wherein
the first processor of the game apparatus is configured to:
set a game play allowable time of the game program; and
generate an alarm notification, when the game play time of the game program exceeds the set game play allowable time, for notifying the information processing apparatus that the game play time exceeds the set game play allowable time, and
the third processor of the information processing apparatus is configured to:
control to transmit, to the apparatus, based on an input to the information processing apparatus, an instruction to temporarily cancel the alarm notification.

10. The information processing system according to claim 1, wherein the information processing apparatus comprises a smartphone.

11. The information processing system according to claim 1, wherein the game play state of the game program for each of the one or more users comprises a total game playing time for each of the one or more users.

12. An information processing apparatus comprising:
communication circuitry; and
a processor configured to:
control to receive game state data indicating a game play state of a game program executed by a game play apparatus in which user information for respective users of the game apparatus is registered and the game play state data is periodically generated and associated with the user information, the game play state data including at least identification information for identifying the game program;
control to display, on a display, the game play state of the game program for each of the users based on the received game play state data.

13. A non-transitory computer-readable non-transitory storage medium having stored therein an information processing program which, when executed by a computer of an information processing apparatus, causes the computer to control the information processing apparatus to at least:
receive game play state data indicating a game play state of a game program executed by a game apparatus in which user information for respective users of the game apparatus is registered and the game play state data is periodically generated and associated with the user information, the game play state data including at least identification information for identifying the game program; and
display, on a display, the game play state of the game program for each of the users based on the received game play state data.

14. A method for an information processing apparatus, the method comprising:
receiving game play state data indicating a game play state of a game program executed by a game apparatus in which user information for respective users of the game apparatus is registered and the game play state data is periodically generated and associated with the user information, the game play state data including at least identification information for identifying the game program; and
displaying, on a display, the game play state of the game program for each of the users based on the received game play state data.

* * * * *